United States Patent
Nam

(10) Patent No.: US 10,892,683 B2
(45) Date of Patent: Jan. 12, 2021

(54) ELECTRONIC CIRCUIT FOR ESTIMATING INTENSITY OF LOAD CURRENT BASED ON INTERNAL CONDITION OF BOOST CONVERTER

(71) Applicant: SAMSUNG ELECTRONICS CO., LTD., Suwon-si (KR)

(72) Inventor: Hyunseok Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/506,232

(22) Filed: Jul. 9, 2019

(65) Prior Publication Data

US 2020/0136510 A1 Apr. 30, 2020

(30) Foreign Application Priority Data

Oct. 25, 2018 (KR) .................. 10-2018-0127973

(51) Int. Cl.
*H02M 3/158* (2006.01)
*H02M 3/157* (2006.01)
(Continued)

(52) U.S. Cl.
CPC .............. *H02M 3/158* (2013.01); *H02J 7/00* (2013.01); *H02M 3/157* (2013.01); *H02J 2207/20* (2020.01); *H02M 2001/0009* (2013.01)

(58) Field of Classification Search
CPC ......... H02M 3/158; H02M 2001/0009; H02M 3/1588; H02M 1/08; H02M 1/00; H02M 3/156; H02J 7/00
See application file for complete search history.

(56) References Cited

U.S. PATENT DOCUMENTS 5,764,037 A 6/1998 Jacobs et al.
6,163,139 A 12/2000 Symonds
(Continued)

FOREIGN PATENT DOCUMENTS

CN 101873071 A 10/2010

OTHER PUBLICATIONS

Current-Sensing Techniques for DC-DC Converters, Hassan Pooya Forghani-zadeh, Student Member, IEEE, and Gabriel A. Rincón-Mora, Senior Member, IEEE.
(Continued)

*Primary Examiner* — Gustavo A Rosario-Benitez
(74) *Attorney, Agent, or Firm* — Volentine, Whitt & Francos, PLLC

(57) ABSTRACT

An electronic circuit includes an inductive element outputting an inductor current, a first transistor, a second transistor, and a load current estimator circuit. The first transistor is connected between a first end of the inductive element and a reference terminal. The second transistor is connected between the first end of the inductive element and an output terminal for outputting a load current. The load current estimator circuit receives a first voltage which is sensed between both ends of the second transistor in response to the inductor current while the first transistor is turned off and the second transistor is turned on, and outputs a second voltage based on a level of the first voltage at a reference time point within a time interval when the second transistor is turned on. The second voltage is associated with an intensity of the load current.

17 Claims, 18 Drawing Sheets

(51) Int. Cl.
*H02J 7/00* (2006.01)
*H02M 1/00* (2006.01)

(56) References Cited

U.S. PATENT DOCUMENTS

| | | | |
|---|---|---|---|
| 6,469,917 B1 | 10/2002 | Ben-Yaakov | |
| 6,982,887 B2 | 1/2006 | Batarseh et al. | |
| 8,736,244 B1 | 5/2014 | Voigtlander | |
| 9,503,002 B2* | 11/2016 | Kim | H02P 7/0066 |
| 9,531,249 B2* | 12/2016 | Yoon | H02M 3/1588 |
| 9,651,966 B2 | 5/2017 | Cui et al. | |
| 9,748,843 B2 | 8/2017 | Zhang et al. | |
| 2009/0051338 A1* | 2/2009 | Wang | H02M 3/156 |
| | | | 323/285 |
| 2012/0049825 A1* | 3/2012 | Chen | H02M 3/156 |
| | | | 323/284 |
| 2014/0016381 A1* | 1/2014 | Sun | G01R 19/22 |
| | | | 363/89 |
| 2014/0253089 A1* | 9/2014 | Qin | H02M 3/158 |
| | | | 323/316 |
| 2015/0115922 A1* | 4/2015 | Liu | H03K 7/08 |
| | | | 323/282 |
| 2015/0207416 A1* | 7/2015 | Kim | H02M 3/33507 |
| | | | 363/21.18 |
| 2015/0222171 A1* | 8/2015 | Nguyen | H02M 1/08 |
| | | | 323/282 |
| 2015/0236590 A1* | 8/2015 | Yonezawa | H02M 1/08 |
| | | | 323/271 |
| 2015/0303808 A1* | 10/2015 | Ryotaro | H02M 3/1588 |
| | | | 323/271 |
| 2016/0141957 A1* | 5/2016 | Ozawa | H02M 3/156 |
| | | | 323/271 |
| 2017/0025947 A1* | 1/2017 | Wang | H02M 1/4225 |
| 2018/0123440 A1 | 5/2018 | Lee et al. | |
| 2020/0021189 A1* | 1/2020 | Li | H03F 3/45071 |

OTHER PUBLICATIONS

On-Chip Digital Inductor Current Sensor for Monolithic Digitally Controlled DC-DC Converter, Man Pun Chan, Student Member, IEEE, and Philip K. T. Mok, Senior Member, IEEE, IEEE Transactions on Circuits and Systems—I: Regular Papers, vol. 60, No. 5, May 2013.

* cited by examiner

ELECTRONIC CIRCUIT FOR ESTIMATING INTENSITY OF LOAD CURRENT BASED ON INTERNAL CONDITION OF BOOST CONVERTER

CROSS-REFERENCE TO RELATED APPLICATION

A claim for priority under 35 U.S.C. § 119 is made to Korean Patent Application No. 10-2018-0127973 filed on Oct. 25, 2018, in the Korean Intellectual Property Office, the entirety of which is hereby incorporated herein by reference.

BACKGROUND

The present disclosure relates to an electronic circuit, and more particularly, relates to configurations and operations of an electronic circuit which is capable of providing voltage conversion.

Various types of electronic devices currently in use perform functions depending on operations of various electronic circuits included in the electronic devices. The electronic circuits operate based on power (e.g., a voltage and a current) supplied from a power source (e.g., a battery or an external power source).

Some electronic circuits typically provide power conversion (e.g., voltage conversion) to supply power required to operate other electronic circuits. For example, some electronic circuits may increase and/or decrease a level of a voltage output from its corresponding power source, and thus may output a converted voltage of increased and/or decreased level. The converted voltage may be generated to have a level suitable to operate another electronic circuit.

An amount of power consumed by an electronic device and the electronic circuits therein may vary due to various factors such as an operation circumstance of the electronic device, requirements from a user, and/or the like. The accurate measurement or estimation of power consumption of an electronic device may be required to operate the electronic device efficiently. For example, when an operation frequency, an operation voltage, and an operation status are adjusted depending on power consumption of an electronic device, operation circumstances (e.g., heat emission, device lifespan, battery use, and/or the like) may be efficiently managed. This may improve user satisfaction, and thus accurate measurement or estimation of power consumption of the electronic devices becomes an important issue.

SUMMARY

Embodiments of the inventive concepts provide an electronic circuit for estimating an intensity of a load current which is output from a boost converter capable of supplying a voltage of an increased (or boosted) level. In example embodiments, the electronic circuit may indirectly estimate the intensity of the load current based on a voltage between both ends of a switch element (e.g., a transistor) within the boost converter, instead of directly sensing the intensity of the load current.

Embodiments of the inventive concepts provide an electronic circuit including an inductive element, a first transistor, a second transistor, and a load current estimator circuit. The inductive element has a first end and a second end. The first end is connected to an input terminal receiving an input current. The inductive element outputs an inductor current at the second end based on the input current. The first transistor is connected between the second end of the inductive element and a reference terminal which a reference voltage is applied. The second transistor has first and second ends. The first end of the second transistor is connected to the second end of the inductive element and the second end of the second transistor is connected to an output terminal of the electronic circuit. The second transistor outputs a load current to the output terminal. The load current estimator circuit receives a first voltage sensed between the first and second ends of the second transistor in response to the inductor current when the first transistor is turned off and the second transistor is turned on, and outputs a second voltage based on a level of the first voltage at a reference time point within a first time interval when the second transistor is turned on. The second voltage is associated with an intensity of the load current.

Embodiments of the inventive concepts further provide an electronic circuit including a boost converter and a load current estimator circuit. The boost converter outputs an output voltage at an output terminal, the output voltage having a level boosted to be higher than a level of an input voltage at an input terminal. The load current estimator circuit receives a first voltage sensed at the boost converter without sensing an input current input to the input terminal and without sensing a load current output from the output terminal, and outputs a second voltage associated with an intensity of the load current, based on the first voltage. The level of the output voltage changes with a first pattern in a first time interval, and changes with a second pattern in a second time interval which does not overlap the first time interval. A level of the second voltage changes based on a level of the first voltage in the first time interval and a duration of the first time interval.

Embodiments of the inventive concepts still further provide an electronic circuit including a boost converter and a load current estimator circuit. The boost converter outputs an output voltage having a level boosted to be higher than a level of an input voltage. The load current estimator receives a first voltage sensed at the boost converter. A level of the first voltage changes in a first time interval during which the level of the output voltage changes with a first pattern. The level of the first voltage corresponds to a level of a reference voltage in a second time interval during which the level of the output voltage changes with a second pattern. The load current estimator circuit outputs a second voltage based on the level of the first voltage which is sampled at a reference time point within the first time interval to provide a sampled level of the first voltage, irrespective of the level of the first voltage in the second time interval.

Embodiments of the inventive concepts also provide an electronic circuit including an inductive element, a first switch element, a second switch element, a load current estimator circuit, a first controller, and a second controller. The inductive element has a first end and a second end. The first end of the inductive element is connected to an input terminal receiving an input current. The inductive element outputs an inductor current at the second end based on the input current. The first switch element is connected between the second end of the inductive element and a reference terminal which a reference voltage is applied. The second switch element has first and second ends. The first end of the second switch element is connected to the second end of the inductive element and the second end of the second switch element is connected to an output terminal of the electronic circuit. The second switch element outputs a load current to the output terminal. The load current estimator circuit receives a first voltage sensed between the first and second ends of the second switch element in response to the inductor current when the first switch element is disconnected and the second switch element is connected, and outputs a second voltage associated with an intensity of the load current based on the first voltage. The first controller controls the first switch element and the second switch element in a first manner when the second voltage satisfies a first condition. The second controller controls the first switch element and the second switch element in a second manner different from the first manner when the second voltage satisfies a second condition different from the first condition.

Embodiments of the inventive concepts also provide an electronic circuit including a boost converter configured to output an output voltage at an output terminal responsive to an input voltage at an input terminal, the output voltage having a level higher than a level of the input voltage, the boost converter including an inductive element having a first end and a second end, the first end connected to the input terminal, and the boost converter further including a first switch element having a first end and a second end, the first end of the first switch element connected to the second end of the inductive element and the second end of the first switch element connected to the output terminal; and a load current estimator circuit is further configured to output the second voltage based on the level of the first voltage which is sampled at a reference time point within the first time interval to provide a sampled level, irrespective of the level of the first voltage in the second time terminal.

In example embodiments, an input current or a load current is not directly sensed, but an internal condition (e.g., an internal voltage) of a boost converter is used. Accordingly, an intensity of the load current may be accurately estimated without being affected by a change in an external circumstance. In addition, an external element for directly sensing the input current or the load current is not required, and thus power consumption may be reduced and a circuit area may decrease.

BRIEF DESCRIPTION OF THE DRAWINGS

The above and other objects and features of the present disclosure will become apparent in view of the following detailed description of example embodiments with reference to the accompanying drawings.

DETAILED DESCRIPTION

Example embodiments will hereinafter be described in detail and clearly with reference to the accompanying drawings such that one of ordinary skill in the art can easily implement the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
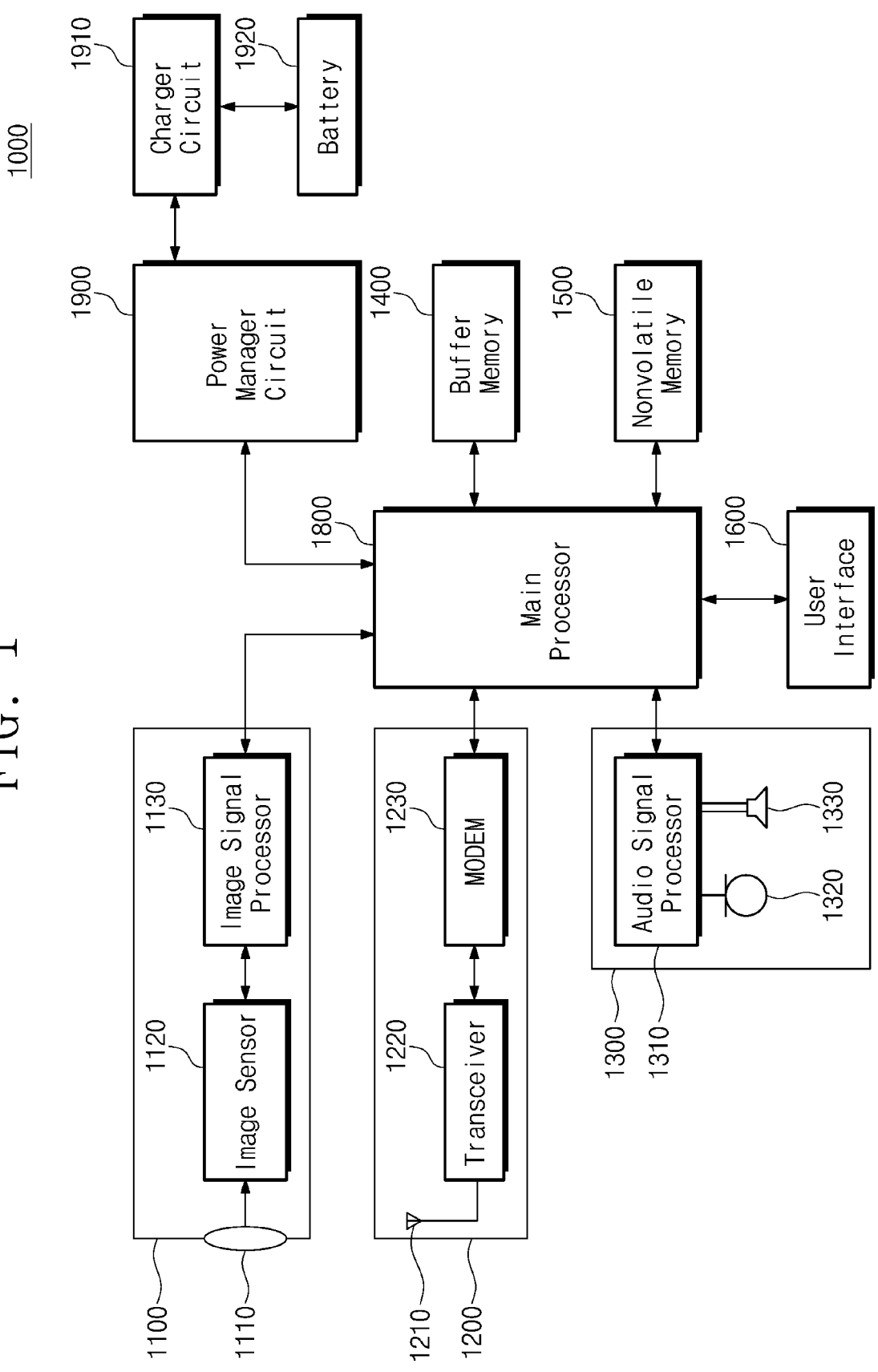
FIG. 1 illustrates a block diagram of a configuration of an electronic device which may include an electronic circuit according to embodiments of the inventive concepts.

FIG. 1 illustrates a block diagram of a configuration of an electronic device 1000 which may include an electronic circuit according to embodiments of the inventive concepts.

For example, the electronic device 1000 may be implemented in one of various types of electronic devices such as a desktop computer, a tablet computer, a laptop computer, a smart phone, a wearable device, a workstation, a server, an electric vehicle, a home appliance, a medical appliance, and/or the like.

The electronic device 1000 may include various electronic circuits. For example, the electronic circuits of the electronic device 1000 includes an image processing block 1100, a communication block 1200, an audio processing block 1300, a buffer memory 1400, a nonvolatile memory 1500, a user interface 1600, a main processor 1800, a power manager circuit 1900, and a charger circuit 1910. In some embodiments the electronic device 1000 may include additional electronic circuits and/or may exclude some of the electronic circuits shown.

For example, the electronic device 1000 as shown is connected to a battery 1920, and the battery 1920 may supply power used in an operation of the electronic device 1000. However, the inventive concepts are not limited to this example, and the power supplied to the electronic device 1000 may come from another internal/external power source other than the battery 1920.

The image processing block 1100 may receive light through a lens 1110. An image sensor 1120 and an image signal processor 1130 included in the image processing block 1100 may generate image information associated with an external object, based on the received light.

The communication block 1200 may exchange a signal with an external device/system through an antenna 1210. A transceiver 1220 and a modulator/demodulator (MODEM) 1230 of the communication block 1200 may process the signal exchanged with the external device/system, in compliance with one or more of various wired/wireless communication protocols.

The audio processing block 1300 may process sound information by using an audio signal processor 1310. The audio processing block 1300 may for example receive an audio input through a microphone 1320, and may output audio through a speaker 1330.

The buffer memory 1400 may store data used in an operation of the electronic device 1000. For example, the buffer memory 1400 may temporarily store data processed or to be processed by the main processor 1800. For example, the buffer memory 1400 may include volatile memory such as for example static random access memory (SRAM), dynamic RAM (DRAM), and/or synchronous DRAM (SDRAM) or the like, and/or nonvolatile memory such as for example phase-change RAM (PRAM), magneto-resistive RAM (MRAM), resistive RAM (ReRAM), and/or a ferroelectric RAM (FRAM) or the like.

The nonvolatile memory 1500 may store data irrespective of whether power is supplied. For example, the nonvolatile memory 1500 may include at least one of various nonvolatile memories such as flash memory, PRAM, MRAM, ReRAM, and/or FRAM or the like. For example, the nonvolatile memory 1500 may include a removable memory such as a secure digital (SD) card or a solid state drive (SSD), and/or an embedded memory such as an embedded multimedia card (eMMC).

The user interface 1600 may arbitrate in communication between a user and the electronic device 1000. For example, the user interface 1600 may include an input interface for receiving an input from the user and an output interface for providing information to the user.

The main processor 1800 may control overall operations of components of the electronic device 1000. The main processor 1800 may process various operations to operate the electronic device 1000. For example, the main processor 1800 may be implemented as a general-purpose processor, a special-purpose processor, an application processor, or a microprocessor, and may include one or more processor cores.

The power manager circuit 1900 and the charger circuit 1910 may supply the power which is used to operate the electronic device 1000. This will be described with reference to FIG. 2.

Figure 2:
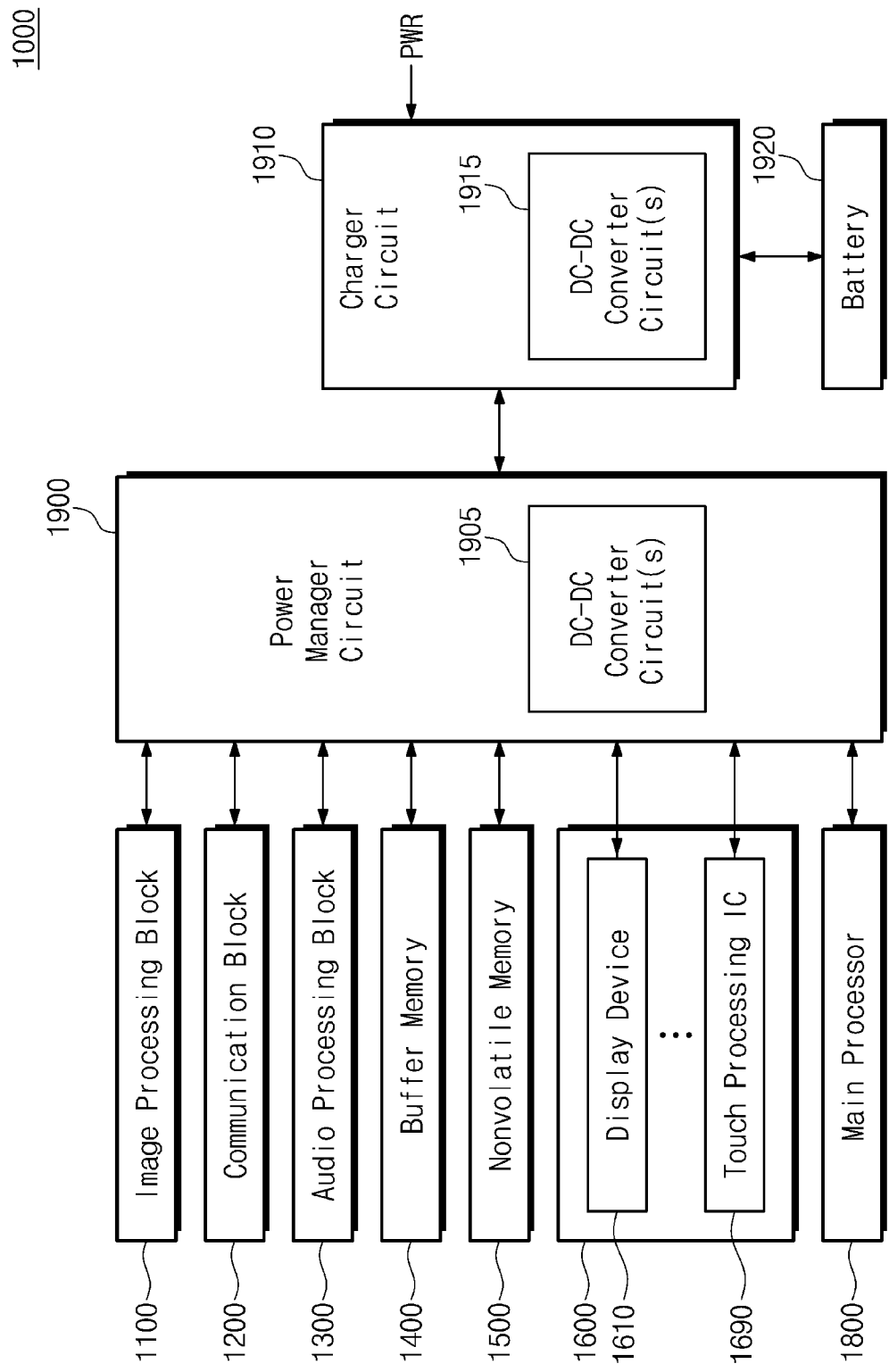
FIG. 2 illustrates a block diagram of a configuration associated with transferring power to components in an electronic device of FIG. 1.

FIG. 2 illustrates a block diagram of a configuration associated with transferring the power to the components in the electronic device 1000 of FIG. 1.

The power manager circuit 1900 may supply the power to the components of the electronic device 1000. For example, the charger circuit 1910 may output a system voltage based on power PWR received from the battery 1920 and/or another external power source. The power manager circuit 1900 may output the power to be supplied to the components of the electronic device 1000, based on the system voltage. The power manager circuit 1900 may provide the components of the electronic device 1000 with the power obtained by suitably converting the system voltage.

To this end, for example, the power manager circuit 1900 may include one or more direct current (DC)-DC converter circuits 1905, and the charger circuit 1910 may include one or more DC-DC converter circuits 1915. Each of the DC-DC converter circuits 1905 and 1915 may convert an input DC voltage to generate an output DC voltage. The output voltage may be converted from the input voltage such that a level of the output voltage is higher or lower than a level of the input voltage.

For example, the DC-DC converter circuits 1905 and 1915 may include a boost converter. The boost converter may output an output voltage, where a level of the output voltage of the boost converter is increased or boosted to be higher than a level of the input voltage. This will be described with reference to FIGS. 3 to 7.

For example, a voltage and a current output from the DC-DC converter circuit 1905 may be transferred to at least one of the image processing block 1100, the communication block 1200, the audio processing block 1300, the buffer memory 1400, the nonvolatile memory 1500, the user interface 1600 (e.g., input/output interfaces such as a display device 1610 and a touch processing integrated circuit (IC) 1690), and/or the main processor 1800. The components of the electronic device 1000 may operate based on the transferred current and voltage.

The components illustrated in FIGS. 1 and 2 are provided to facilitate better understanding, and are not intended to limit the present disclosure. The electronic device 1000 may not include one or more of the components illustrated in FIGS. 1 and 2, and/or may further include at least one component not illustrated in FIGS. 1 and 2.

Hereinafter, example configurations associated with the DC-DC converter circuit 1905 or 1915 will be described. However, example embodiments may be employed for other components of the electronic device 1000 to convert an input voltage to an output voltage. It should be readily understood that the inventive concepts are not limited to being associated with the DC-DC converter circuit 1905 or 1915.

Figure 3:
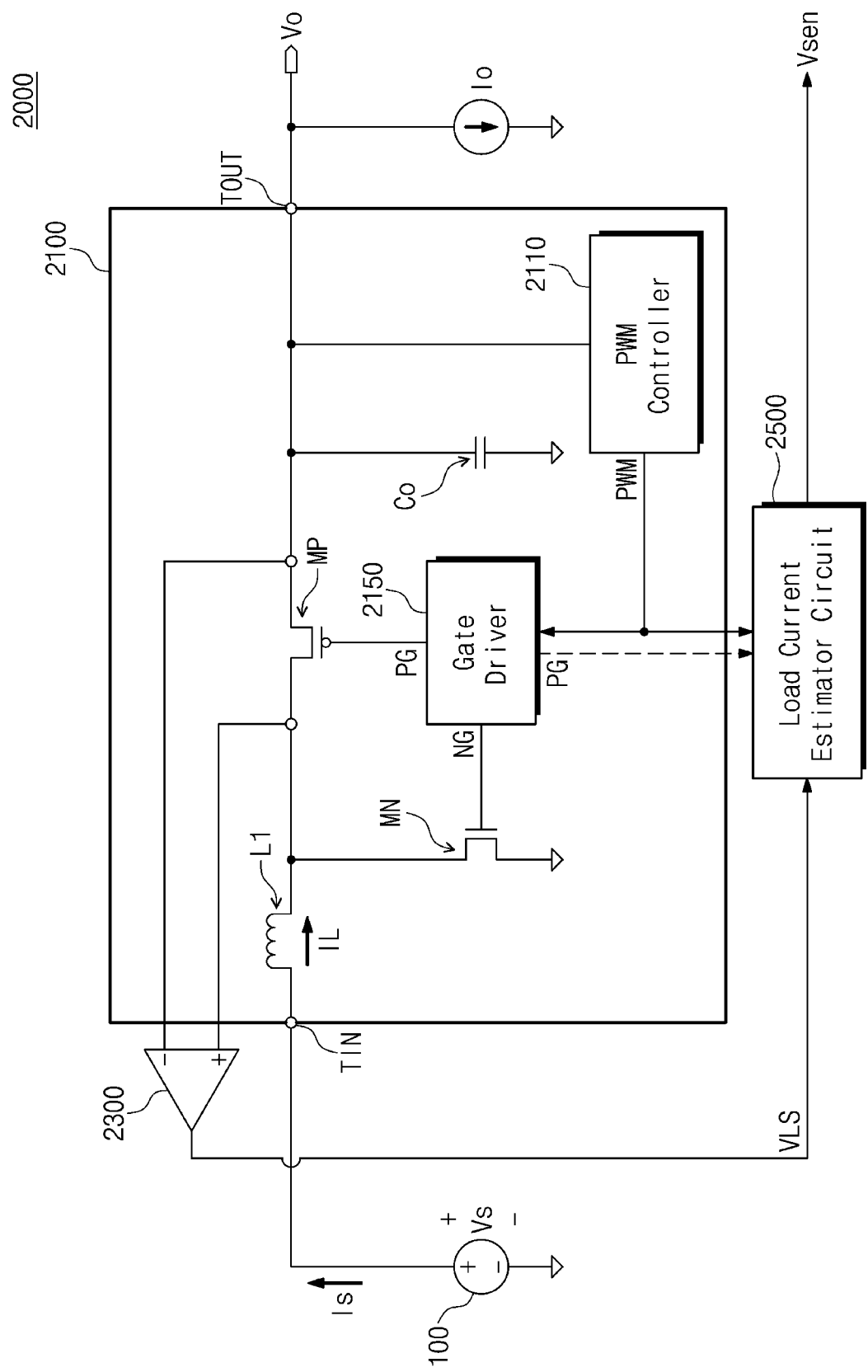
FIG. 3 illustrates a block diagram of a configuration of an electronic circuit included in a DC-DC converter circuit of FIG. 2.
Figure 8:
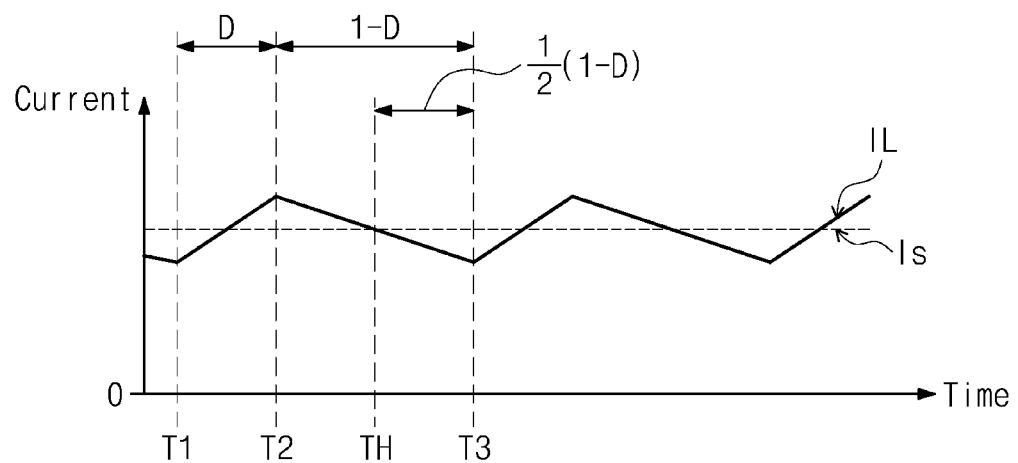
FIG. 8 illustrates a graph descriptive of a current sensed from a boost converter of FIG. 3.
Figure 9:
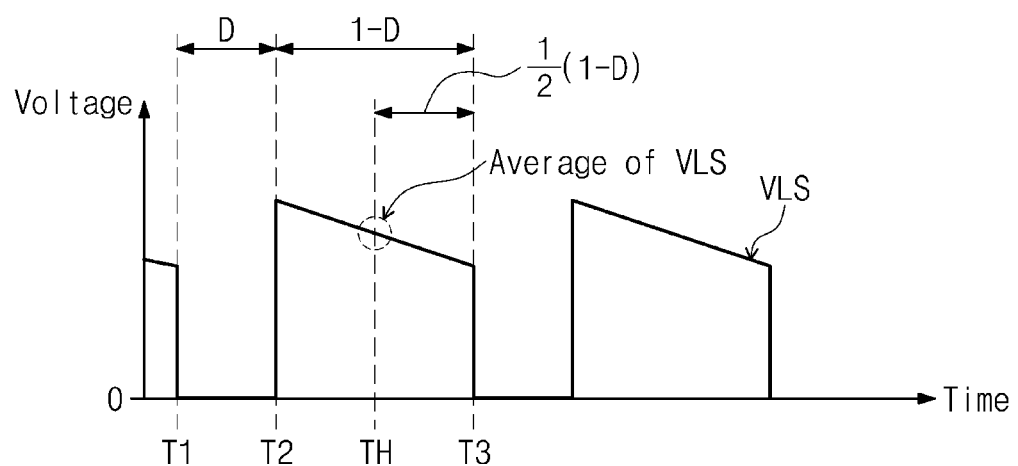
FIG. 9 illustrates a graph descriptive of a voltage sensed from a boost converter of FIG. 3.

FIG. 3 illustrates a block diagram of a configuration of an electronic circuit 2000 included in the DC-DC converter circuit 1905 or 1915 of FIG. 2. FIGS. 4 to 7 illustrate graphs descriptive of an operation of a boost converter 2100 of FIG. 3. FIGS. 8 and 9 illustrate graphs respectively descriptive of a current and a voltage VLS sensed from the boost converter 2100 of FIG. 3. To facilitate better understanding, FIGS. 4 to 9 will be referenced together with FIG. 3.

Referring to FIG. 3, the electronic circuit 2000 includes the boost converter 2100, a voltage sensor 2300, and a load current estimator circuit 2500. The boost converter 2100 may include an inductive element L1, switch elements MN and MP, a capacitive element Co, a pulse width modulation (PWM) controller 2110, and a gate driver 2150. The inductive element L1 may be an inductor. The capacitive element Co may be a capacitor.

An input terminal TIN of the boost converter 2100 is connected to an input voltage Vs. The boost converter 2100 may receive an input current Is from a power source 100 through the input terminal TIN. The power source 100 may correspond to the charger circuit 1910, the battery 1920, and/or any other external power source. The power source 100 may provide power to the boost converter 2100 based on the input voltage Vs and the input current Is.

The boost converter 2100 outputs power through an output terminal TOUT. For example, an output voltage Vo and a load current Io may be output from the output terminal TOUT. The output voltage Vo and the load current Io are converted from the input voltage Vs and the input current Is by the boost converter 2100. The output voltage Vo and the load current Io may be used as power for operating components of the electronic device 1000.

The inductive element L1 may be an element such as an inductor or a coil. A first end of the inductive element L1 is connected to the input terminal TIN. The inductive element L1 receives the input current Is. The inductive element L1 outputs an inductor current IL based on the input current Is.

The switch elements MN and MP may be an element such as a transistor, a diode, or a gate. The switch element MN is connected between a second end of the inductive element L1 and a reference potential (e.g., a ground voltage). The switch element MP is connected between the second end of the inductive element L1 and the output terminal TOUT. The switch elements MN and MP may connect or disconnect a current path through which a current flows. The boost converter 2100 includes the inductive element L1 and the switch element MP between the input terminal TIN and the output terminal TOUT.

Hereinafter, it may be assumed that the switch element MN is an n-channel metal oxide semiconductor (NMOS) transistor and the switch element MP is a p-channel metal oxide semiconductor (PMOS) transistor. However, this assumption is provided to facilitate better understanding, and the inventive concepts are not limited thereto. It should be readily understood that a kind and a type of each of the switch elements MN and MP may be variously changed or modified to connect or disconnect a current path.

For example, when the switch element is a transistor and the transistor is turned on in response to a gate voltage, it should be understood that the switch element is connected to provide a current path such that a current flows. On the other hand, when the switch element is a transistor and the transistor is turned off, it should be understood that the switch element is disconnected and does not provide a current path such that a current does not flow.

As the switch elements MN and MP are connected, a current path for the inductor current IL is provided. For example, when the switch element MN is connected (e.g., when the NMOS transistor is turned on), the inductor current IL may flow to a terminal of the reference potential through the switch element MN. For example, when the switch element MP is connected (e.g., when the PMOS transistor is turned on), the inductor current IL may flow to the output terminal TOUT through the switch element MP.

A level of the output voltage Vo and an intensity of the load current Io may vary depending on connection and disconnection of the switch elements MN and MP (e.g., turn-on and turn-off of transistors). In other words, as the boost converter 2100 controls connection and disconnection of the switch elements MN and MP, the output voltage Vo and the load current Io may be controlled to have an intended level and an intended intensity.

The PWM controller 2110 is connected to the output terminal TOUT. The PWM controller 2110 may generate a control signal PWM based on the output voltage Vo. For example, the PWM controller 2110 may generate the control signal PWM based on a result of comparing the output voltage Vo and a reference voltage. Herein, a level of the reference voltage may be associated with a target level of a voltage (i.e., an intended level of the output voltage Vo) output from the boost converter 2100. The control signal PWM may be generated to control the output voltage Vo such that a level of the output voltage Vo becomes substantially identical to the level of the reference voltage. To this end, connection and disconnection of the switch elements MN and MP may be controlled based on the control signal PWM.

The gate driver 2150 outputs control signals NG and PG based on the control signal PWM. The switch element MN may be connected or disconnected in response to the control signal NG, and the switch element MP may be connected or disconnected in response to the control signal PG. The gate driver 2150 may drive the control signals NG and PG from the control signal PWM such that the control signals NG and PG have intensities sufficient to control the switch elements MN and MP.

The capacitive element Co buffers a voltage of the output terminal TOUT. In addition, while the switch element MP is disconnected, the output voltage Vo and the load current Io may be supplied based on charges which have been stored in the capacitive element Co.

Figure 4:
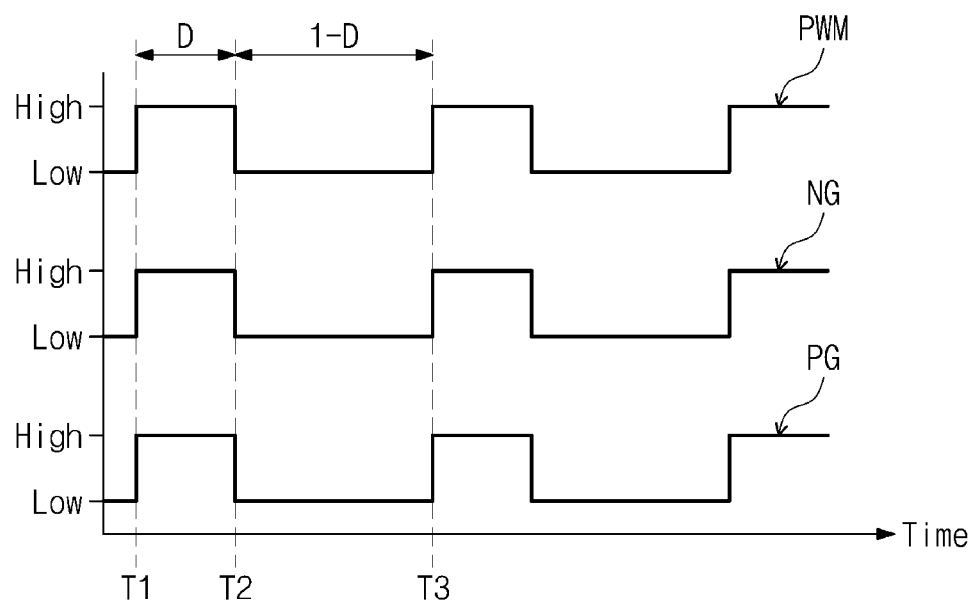
FIG. 4 illustrates a graph descriptive of an operation of a boost converter of FIG. 3.

Referring to FIG. 4, the control signal PWM may alternately have a level corresponding to logic high and a level corresponding to logic low. For example, the control signal PWM may have the level corresponding to logic high in a time interval between time T1 and T2, and may have the level corresponding to logic low in a time interval between time T2 and T3. The time interval between time T1 and T2 does not overlap the time interval between time T2 and T3.

A level of the control signal PWM may periodically vary. For example, a time interval between time T1 and T3 may correspond to one period. The control signal PWM may successively have the level corresponding to logic high and the level corresponding to logic low. After one period passes, a next period may follow whereby the control signal PWM may again successively have the level corresponding to logic high and the level corresponding to logic low.

For example, logic high of the control signal PWM may be maintained during a duration D of the period, and logic low of the control signal PWM may be maintained during a duration (1−D) (D being a real number between 0 and 1) of the period. Herein, 0, D, and 1 may be associated with a relative time duration.

For example, when D is 0.4, the control signal PWM has the level corresponding to logic high during a duration corresponding to 0.4 of one period, and has the level corresponding to logic low during a duration corresponding to 0.6 (=1−0.4) of one period. The control signal PWM may include pulses depending on a duty ratio of the duration D and the duration (1−D).

The control signals NG and PG may be generated based on the control signal PWM, to be suitable to control connection and disconnection of the switch elements MN and MP. FIG. 4 illustrates that a waveform of each of the control signals NG and PG is substantially identical to a waveform of the control signal PWM. However, it should be readily understood that a waveform of each of the control signals NG and PG may be suitably changed or modified depending on a kind and a type of each of the switch elements MN and MP.

Figure 5:
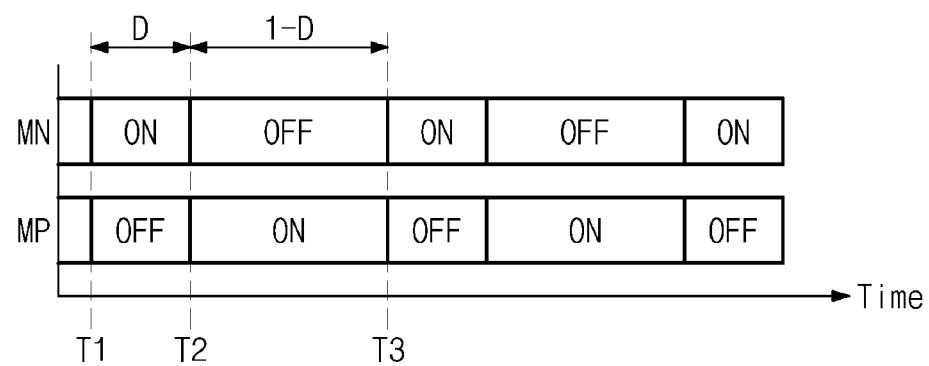
FIG. 5 illustrates a graph descriptive of an operation of a boost converter of FIG. 3.

Referring to FIG. 5, the switch element MN is connected in response to logic high of the control signal NG, and is disconnected in response to logic low of the control signal NG. The switch element MP is disconnected in response to logic high of the control signal PG, and is connected in response to logic low of the control signal PG.

For example, connection of the switch element MN and connection of the switch element MP in this embodiment is mutually exclusive. For example, the switch element MP is disconnected when the switch element MN is connected, and the switch element MP is connected when the switch element MN is disconnected. Connection and disconnection of the switch elements MN and MP may be repeated depending on the duration D and the duration (1−D).

Figure 6:
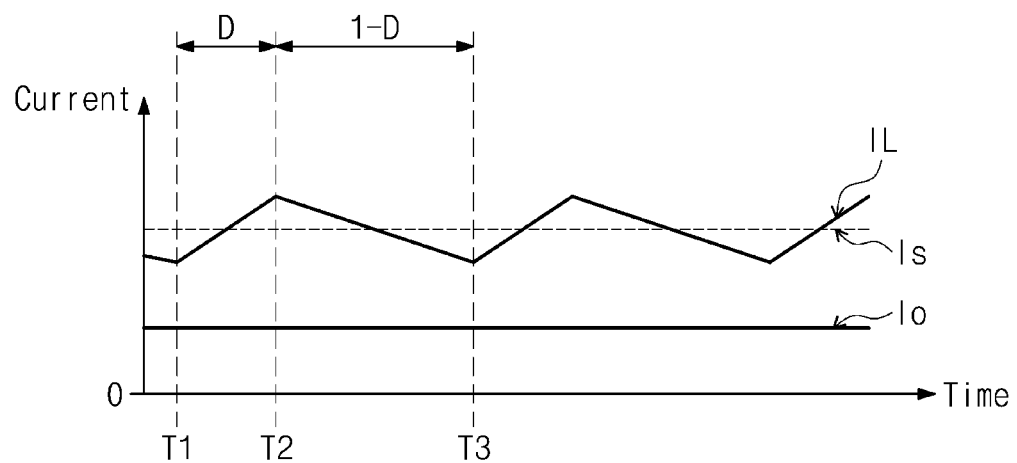
FIG. 6 illustrates a graph descriptive of an operation of a boost converter of FIG. 3.

Referring to FIG. 6, an intensity of the input current Is may be substantially constant. However, an increase and a decrease in the intensity of the inductor current IL may be repeated as connection and disconnection of the switch elements MN and MP are repeated depending on the duty ratio of the duration D and the duration (1−D).

For example, in the time interval between time T1 and T2, while the switch element MN is connected and the switch element MP is disconnected, the intensity of the inductor current IL may increase. On the other hand, in the time interval between time T2 and T3, while the switch element MN is disconnected and the switch element MP is connected, the intensity of the inductor current IL may decrease. An average intensity of the inductor current IL may correspond to the intensity of the input current Is.

As the inductor current IL is transferred to the output terminal TOUT, the load current Io may be output from the boost converter 2100. An average intensity of the load current Io may be lower than the intensity of the input current Is.

Figure 7:
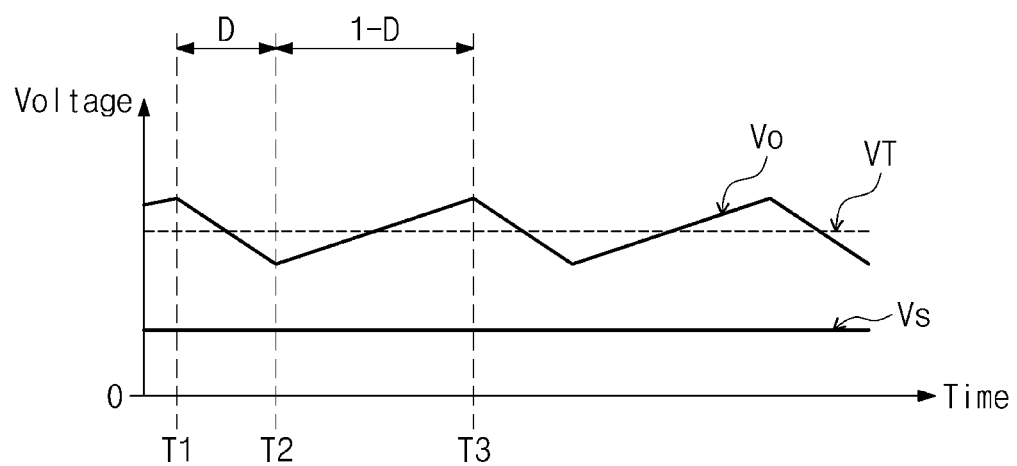
FIG. 7 illustrates a graph descriptive of an operation of a boost converter of FIG. 3.

Referring to FIG. 7, a level of the input voltage Vs may be substantially constant. However, as an increase and a decrease in the intensity of the inductor current IL is repeated depending on the duty ratio of the duration D and the duration (1−D), an increase and a decrease in a level of the output voltage Vo may be repeated.

For example, in the time interval between time T2 and T3, when the intensity of the inductor current IL decreases, the level of the output voltage Vo may change by a first pattern (e.g., an increasing pattern). On the other hand, in the time interval between time T1 and T2, when the intensity of the inductor current IL increases, the level of the output voltage Vo may change by a second pattern (e.g., a decreasing pattern). However, a change in the level of the output voltage Vo is not limited to this example, and may be observed differently from illustration of FIG. 7 based on connection and disconnection of the switch elements MN and MP. It should be readily understood that this example is provided to facilitate better understanding.

An average level of the output voltage Vo may correspond to a level of a target voltage VT. The target voltage VT may be a voltage which the boost converter 2100 intends to output as the output voltage Vo.

The level of the target voltage VT in this embodiment is higher than the level of the input voltage Vs. Accordingly, the boost converter 2100 may output the output voltage Vo, which has the level increased or boosted to be higher than the level of the input voltage Vs of the input terminal TIN, to the output terminal TOUT.

Meanwhile, the level of the target voltage VT may change depending on the duty ratio of the duration D and the duration (1−D). For example, when the duration D become short (e.g., when the duration D changes from 0.4 to 0.2 and the duration (1−D) changes from 0.6 to 0.8), an amount of energy stored in the inductive element L1 during the duration D may decrease, and thus an amount of energy transferred to the output terminal TOUT in the duration (1−D) may decrease. Accordingly, the level of the target voltage VT may decrease.

On the other hand, when the duration D become long (e.g., when the duration D changes from 0.4 to 0.6 and the duration (1−D) changes from 0.6 to 0.4), an amount of energy, which is stored in the inductive element L1 during the duration D and thus is transferred to the output terminal TOUT in the duration (1−D), may increase. Accordingly, the level of the target voltage VT may increase. In other words, when a pulse width (e.g., the duration D) of the control signal PWM is adjusted, the level of the target voltage VT may increase or decrease. In this regard, the level of the output voltage Vo may also increase or decrease.

For example, the PWM controller 2110 may determine whether the level of the output voltage Vo becomes lower or higher than the level of the reference voltage. The PWM controller 2110 may output the control signal PWM based on the determination.

For example, when the level of the output voltage Vo becomes lower than the level of the reference voltage, the PWM controller 2110 may generate the control signal PWM such that the duration D increases and the duration (1−D) decreases. In this case, an amount of energy to be transferred to the output terminal TOUT may increase, and thus the decreased level of the output voltage Vo may increase to be restored to the level of the target voltage VT.

On the other hand, when the level of the output voltage Vo becomes higher than the level of the reference voltage, the PWM controller 2110 may generate the control signal PWM such that the duration D decreases and the duration (1−D) increases. In this case, an amount of energy to be transferred to the output terminal TOUT may decrease, and thus the increased level of the output voltage Vo may decrease to be restored to the level of the target voltage VT.

As such, the boost converter 2100 may control the change in the level of the output voltage Vo based on the control signal PWM. As the level of the output voltage Vo changes, the intensity of the load current Io may also change.

Returning to FIG. 3, the load current Io may be transferred to a component of the electronic device 1000 to operate the component. For example, the main processor 1800, the display device 1610, and/or the communication block 1200 may operate while consuming power supplied based on the load current Io.

In this regard, measuring or estimating an amount of power (e.g., the intensity of the load current Io) consumed in each component of the electronic device 1000 may be advantageous to operate the electronic device 1000 efficiently. For example, when the intensity of the load current Io consumed by the main processor 1800 is measured as being excessively high, heat emission and power consumption of the electronic device 1000 may be decreased by decreasing an operation frequency or an operation voltage of the main processor 1800.

As such, when an operation status (e.g., an operation frequency, an operation voltage, and/or the like) is adjusted depending on the intensity of the load current Io, operation circumstances (such as heat emission, device lifespan, battery use, and/or the like) may be efficiently managed. This may improve user satisfaction. As the intensity of the load current Io is measured or estimated more accurately, management efficiency may increase and become higher.

In some implementations, a sensing resistor may be inserted between the output terminal TOUT and the load current Io, and the intensity of the load current Io may be directly measured by sensing an intensity of a current flowing through the sensing resistor. However, in such implementations, when the intensity of the load current Io increases, power loss and heat emission increase by way of the inserted resistor, and overall power efficiency decreases. In addition, the additional sensing resistor causes an increase in a circuit area.

In some other implementations, an internal resistance of the inductive element L1 may be used to estimate the intensity of the load current. The input current Is may flow through the internal resistance, and the intensity of the load current Io may be estimated by sensing the intensity of the current flowing through the internal resistance. However, the internal resistance may significantly vary depending on a temperature, thereby making accurate measurement or estimation difficult.

On the other hand, embodiments of the inventive concepts may indirectly estimate the intensity of the load current Io based on a voltage between both ends of the switch element MP within the boost converter 2100, instead of directly sensing the intensity of the load current Io or the input current Is. How such example embodiments are operable will be understood from the following descriptions.

When it is assumed that there is no power loss in the boost converter 2100, Equation 1 below may be satisfied.

$$V_s \cdot I_s = V_o \cdot I_o \quad \text{[Equation 1]}$$

Equation 2 below may be obtained from Equation 1.

$$\frac{V_o}{V_s} = \frac{I_s}{I_o} \quad \text{[Equation 2]}$$

Meanwhile, a condition of voltage-second balance which is satisfied between both ends of the inductive element L1 may be described by Equation 3 below.

$$V_s \cdot D + (1-D)(V_s - V_o) = 0 \quad \text{[Equation 3]}$$

Equation 4 below may be obtained from Equation 2 and Equation 3.

$$\frac{V_o}{V_s} = \frac{1}{1-D} = \frac{I_s}{I_o} \quad \text{[Equation 4]}$$

Equation 5 below may be obtained from Equation 4.

$$I_o = I_s(1-D) = I_s - D \cdot I_s \quad \text{[Equation 5]}$$

As can be understood from Equation 5, the intensity of the load current Io may be indirectly estimated based on the intensity of the input current Is and the duration D of which the switch element MN is connected. To this end, the voltage sensor 2300 may sense a voltage VLS between the both ends of the switch element MP.

The voltage VLS may be sensed from the both ends of the switch element MP in response to the inductor current IL while the switch element MN is disconnected and the switch element MP is connected (thus while the switch element MP transfers the inductor current IL to the output terminal TOUT). The voltage VLS may be sensed based on the inductor current IL, and the inductor current IL may be generated based on the input current Is. Accordingly, as will be described hereinafter, the voltage VLS may be used to indicate information associated with the intensity of the input current Is.

Referring to FIG. 8, an average intensity of the inductor current IL may correspond to the intensity of the input current Is. For example, at a time point TH which corresponds to a half (½) of the duration (1−D), the changing intensity of the inductor current IL becomes the intensity of the input current Is. In other words, at the time point TH, the information associated with the intensity of the input current Is may be obtained from the intensity of the inductor current IL.

FIG. 9 illustrates a level of the voltage VLS. For example, in the time interval between time T2 and T3 where the switch element MN is disconnected and the switch element MP is connected, while the intensity of the inductor current IL decreases, the level of the voltage VLS decreases. The level of the voltage VLS may change in response to the change in the intensity of the inductor current IL.

On the other hand, in the time interval between time T1 and T2 where the switch element MN is connected and the switch element MP is disconnected, while the intensity of the inductor current IL increases, the level of the voltage VLS may correspond to the level of the reference potential (e.g., ground voltage). The level of the voltage VLS may change depending on the duty ratio of the duration D and the duration (1−D).

Meanwhile, at the time point TH, the level of the voltage VLS becomes an average level of the changing level of the voltage VLS. The voltage VLS may be sensed based on the inductor current IL, and the intensity of the inductor current IL at the time point TH may correspond to the intensity of the input current Is. Accordingly, the level (e.g., the average level) of the voltage VLS at the time point TH may be associated with the intensity of the input current Is.

Returning to FIG. 3, the load current estimator circuit 2500 receives the voltage VLS and the control signal PWM. The load current estimator circuit 2500 may use the information associated with the intensity of the input current Is, based on the voltage VLS. In addition, the load current estimator circuit 2500 may use information associated with the duration D, based on the control signal PWM.

The load current estimator circuit 2500 outputs a voltage Vsen based on the voltage VLS. The load current estimator circuit 2500 may perform an operation which is based on Equation 5, to output the voltage Vsen. Accordingly, the voltage Vsen may be associated with the intensity of the load current Io. This will be described with reference to FIGS. 10 to 20.

In example embodiments, the load current estimator circuit 2500 receives the voltage VLS sensed from the boost converter 2100 by the voltage sensor 2300 and outputs the voltage Vsen based on the voltage VLS, without directly sensing the input current Is input to the input terminal TIN and without directly sensing the load current Io output from the output terminal TOUT.

In example embodiments, an internal condition (e.g., the voltage VLS) of the boost converter 2100 may be used. Accordingly, the intensity of the load current Io may be accurately estimated without being affected by a change in an external circumstance. In addition, an external element for directly sensing the input current Is or the load current Io is not required, and power consumption and a circuit area may be relatively low.

Figure 10:
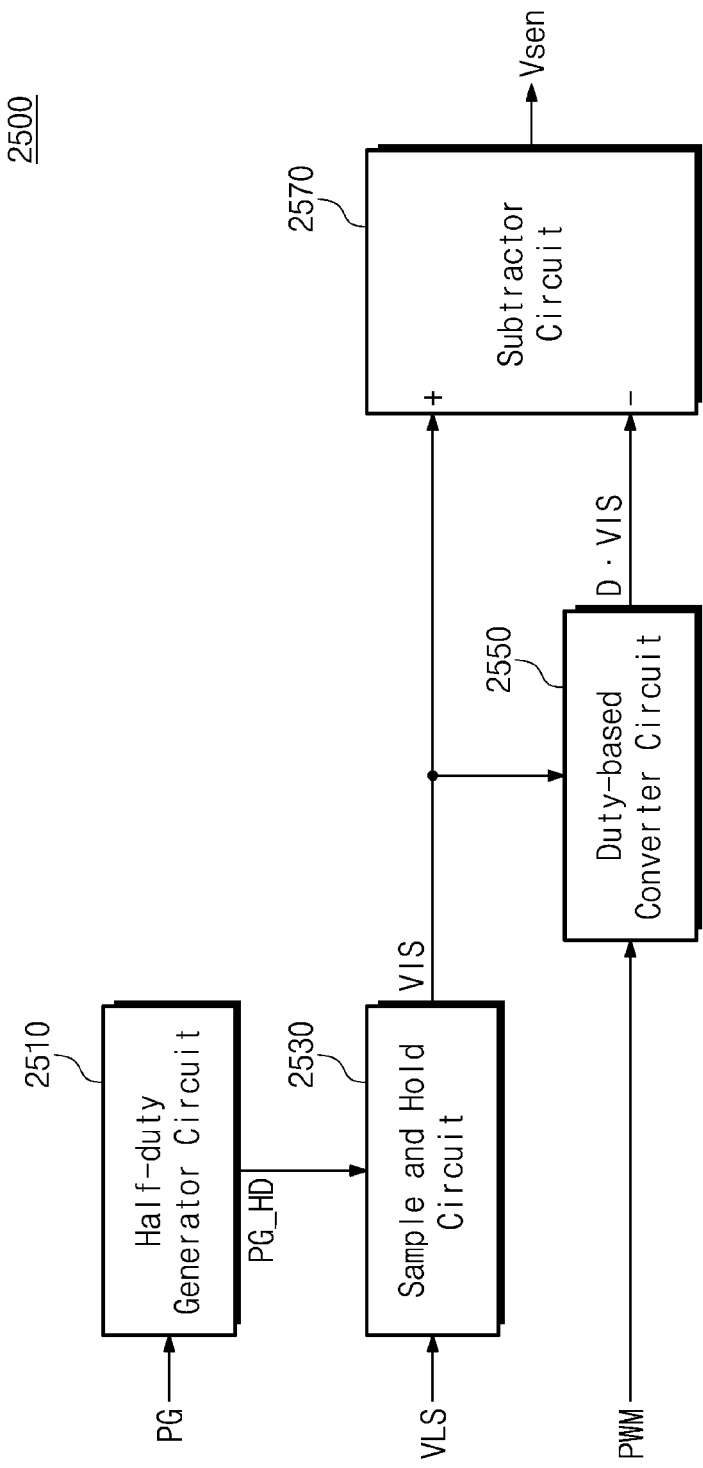
FIG. 10 illustrates a block diagram of a configuration of a load current estimator circuit of FIG. 3.

FIG. 10 illustrates a block diagram of a configuration of the load current estimator circuit 2500 of FIG. 3.

The load current estimator circuit 2500 includes a half-duty generator circuit 2510, a sample and hold circuit 2530, a duty-based converter circuit 2550, and a subtractor circuit 2570. However, the configuration of FIG. 10 is provided to facilitate better understanding, and is not intended to limit the inventive concepts. The configuration of the load current estimator circuit 2500 may be variously changed or modified to perform operations to be described below.

The sample and hold circuit 2530 receives the voltage VLS. The sample and hold circuit 2530 samples the level of the voltage VLS at a reference time point to output a voltage VIS of the sampled level. The sample and hold circuit 2530 may for example include an electronic circuit including a switch, a capacitor, and/or the like, to sample and hold a voltage level.

The reference time point may be a time point within a time interval where the switch element MP is connected and the switch element MN is disconnected. For example, the reference time point may be the time point TH described with reference to FIGS. 8 and 9. In this example, the level of the voltage VIS may be sampled to correspond to the average level of the changing level of the voltage VLS, and may be associated with the intensity of the input current Is.

The half-duty generator circuit 2510 provides the reference time point for sampling the level of the voltage VLS. For example, the half-duty generator circuit 2510 receives the control signal PG associated with controlling the switch element MP. The half-duty generator circuit 2510 outputs a half-duty signal PG_HD based on the control signal PG.

The half-duty signal PG_HD is provided to the sample and hold circuit 2530. The sample and hold circuit 2530 samples the level of the voltage VLS based on the half-duty signal PG_HD. For example, the half-duty signal PG_HD may have an edge at the reference time point such that the sample and hold circuit 2530 samples the level of the voltage VLS at the reference time point in response to the edge of the half-duty signal PG_HD. Example operations of the half-duty generator circuit 2510 and the sample and hold circuit 2530 will be further described with reference to FIGS. 11 and 12.

The duty-based converter circuit 2550 receives the control signal PWM and the voltage VIS. The duty-based converter circuit 2550 uses the information associated with the duration D, based on the control signal PWM. The duty-based converter circuit 2550 outputs a voltage D·VIS based on the control signal PWM and the voltage VIS. A level of the voltage D·VIS may be obtained from the voltage VIS by adjusting the sampled level of the voltage VIS.

As will be described hereinafter, the level of the voltage D·VIS may be obtained as the duration D is applied to the level of the voltage VIS. In other words, the adjusted level of the voltage D·VIS may be obtained by adjusting the sampled level of the voltage VIS by a ratio of the duration D to a sum of the duration D and the duration (1−D). Example configurations and operations of the duty-based converter circuit 2550 will be further described with reference to FIGS. 13 to 17.

The subtractor circuit 2570 receives the voltage VIS and the voltage D·VIS. The subtractor circuit 2570 outputs the voltage Vsen based on a difference between the level of the voltage VIS and the level of the voltage D·VIS. A level of the voltage Vsen may be obtained based on a difference between the level of the voltage VIS and the level of the voltage D·VIS. This may be described by Equation 6 below.

$$Vsen = VIS - D \cdot VIS \qquad \text{[Equation 6]}$$

The voltage VIS may indicate the information associated with the intensity of the input current Is. Accordingly, comparing Equation 5 to Equation 6, it should be understood that the voltage Vsen may be associated with the intensity of the load current Io. Example configurations and operations of the subtractor circuit 2570 will be described with reference to FIGS. 18 to 20.

The load current estimator circuit 2500 uses the voltage VIS which is sampled at the reference time point within the time interval where the switch element MN is disconnected and the switch element MP is connected. Accordingly, the load current estimator circuit 2500 outputs the voltage Vsen based on the sampled level of the voltage VIS at the reference time point, irrespective of the level of the voltage VLS in the time interval where the switch element MN is connected and the switch element MP is disconnected.

Figure 11:
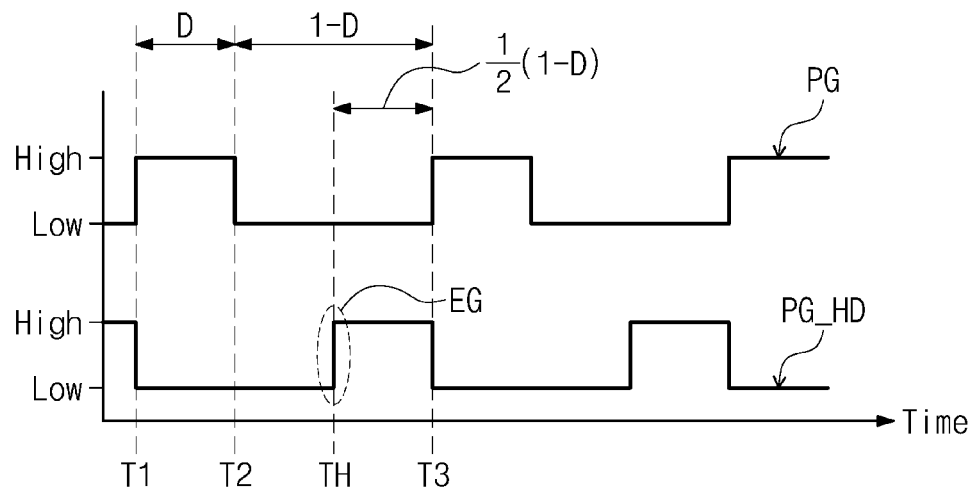
FIG. 11 illustrates a graph descriptive of an operation of a half-duty generator circuit of FIG. 10.

FIG. 11 illustrates a graph descriptive of an example operation of the half-duty generator circuit 2510 of FIG. 10.

The half-duty signal PG_HD has an edge EG at the reference time point. For example, the reference time point may correspond to the time point TH which corresponds to a half (½) of the duration (1−D). The edge EG of the half-duty signal PG_HD may provide the reference time point for sampling the level of the voltage VLS by the sample and hold circuit 2530.

The half-duty generator circuit 2510 refers to a waveform of the control signal PG to provide the edge EG of the half-duty signal PG_HD. The half-duty generator circuit 2510 may include a hardware circuit (e.g., an analog circuit, a logic circuit, and/or the like) configured to generate the half-duty signal PG_HD based on the control signal PG. For example, the half-duty generator circuit 2510 may be implemented by an electronic circuit configured to detect or measure a half (½) of the duration (1−D) of the control signal PG, but the inventive concepts are not limited thereto.

Figure 12:
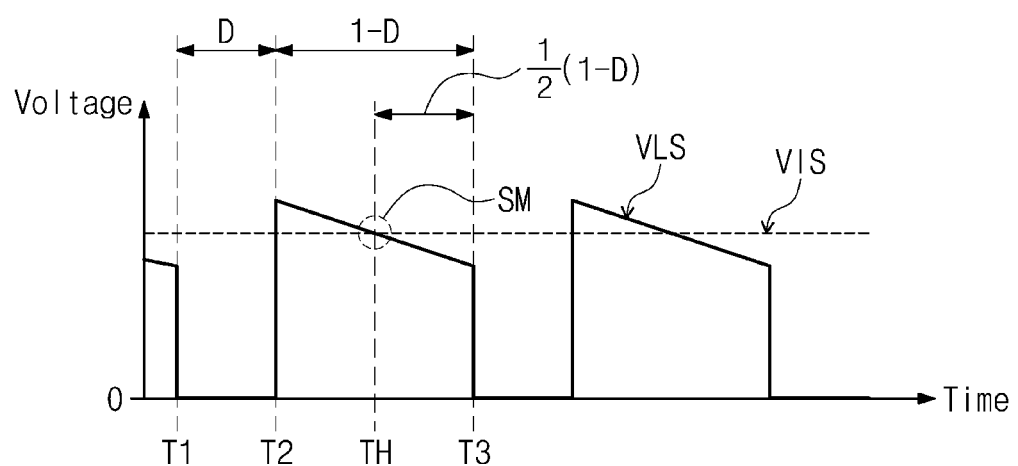
FIG. 12 illustrates a graph descriptive of an operation of a sample and hold circuit of FIG. 10.

FIG. 12 illustrates a graph descriptive of an example operation of the sample and hold circuit 2530 of FIG. 10.

The sample and hold circuit 2530 samples the level of the voltage VLS based on the edge EG of the half-duty signal PG_HD. Accordingly, the sample and hold circuit 2530 generates the voltage VIS of the sampled level SM. For example, the sampled level SM may correspond to the level of the voltage VLS at the reference time point (e.g., the time point TH) where the level of the voltage VLS becomes the average level of the changing level of the voltage VLS.

Figure 13:
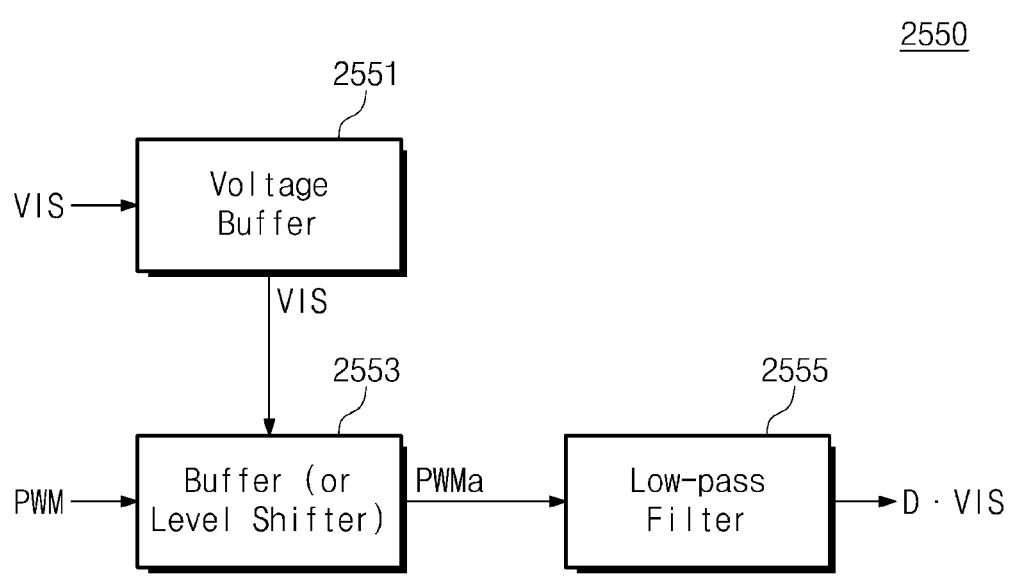
FIG. 13 illustrates a block diagram of a configuration of a duty-based converter circuit of FIG. 10.

FIG. 13 illustrates a block diagram of a configuration of the duty-based converter circuit 2550 of FIG. 10.

The duty-based converter circuit 2550 includes a voltage buffer 2551, a buffer 2553, and a low-pass filter 2555. However, the configuration of FIG. 13 is provided to facilitate better understanding, and is not intended to limit the inventive concepts. The configuration of the duty-based converter circuit 2550 may be variously changed or modified to perform operations to be described below.

The voltage buffer 2551 buffers the voltage VIS. The buffered voltage VIS is provided to the buffer 2553. The buffer 2553 receives the control signal PWM and the voltage VIS. The buffer 2553 generates an intermediate signal PWMa from the control signal PWM by using the voltage VIS (e.g., as an operation voltage).

The intermediate signal PWMa may be generated to have a level to be referenced to generate the voltage D·VIS. To this end, the buffer 2553 buffers pulses of the control signal PWM based on the level of the voltage VIS. In some example embodiments, the buffer 2553 may be implemented as a level shifter circuit to provide a level of the intermediate signal PWMa.

The low-pass filter 2555 receives the intermediate signal PWMa. The low-pass filter 2555 generates the voltage D·VIS based on the intermediate signal PWMa. For example, the low-pass filter 2555 generates the voltage D·VIS by attenuating a high-frequency component of the intermediate signal PWMa.

Figure 14:
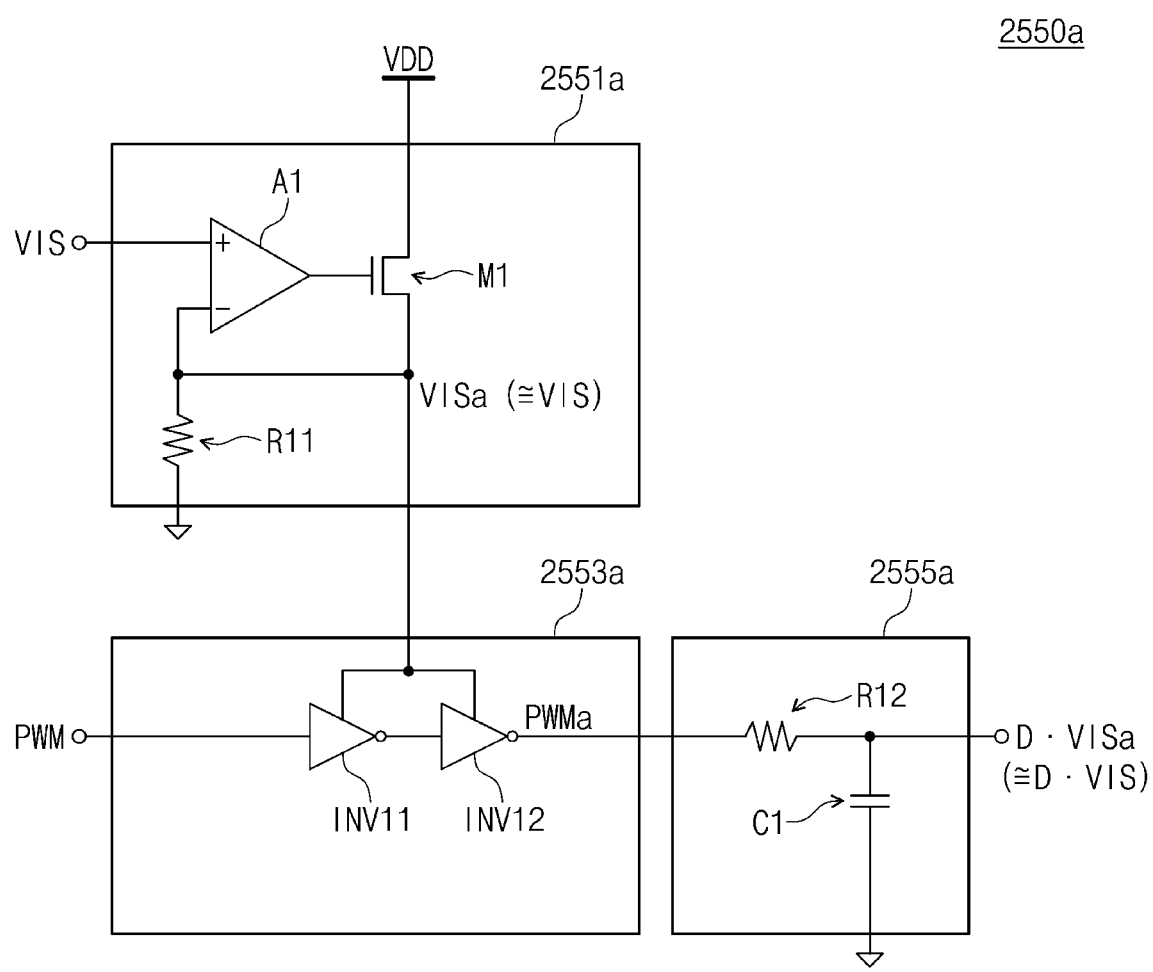
FIG. 14 illustrates a circuit diagram of a configuration of a duty-based converter circuit of FIG. 13.
Figure 15:
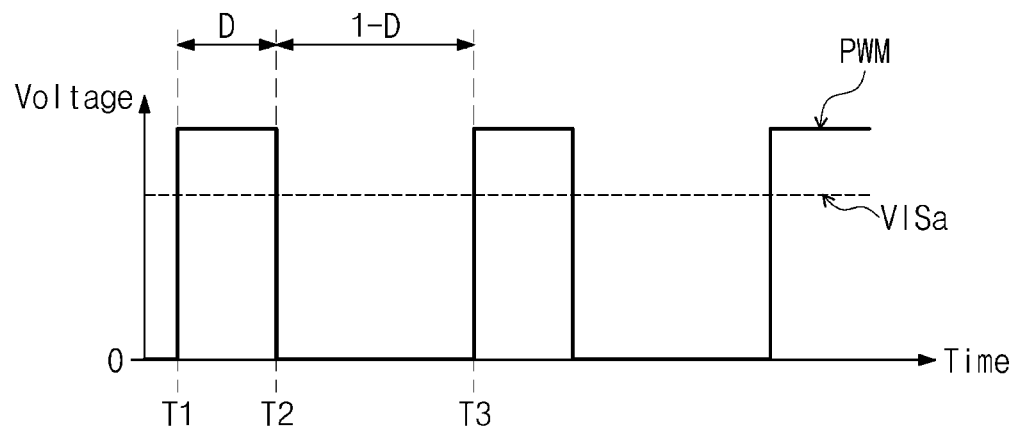
FIG. 15 illustrates a graph descriptive of an operation of a duty-based converter circuit of FIG. 13.
Figure 16:
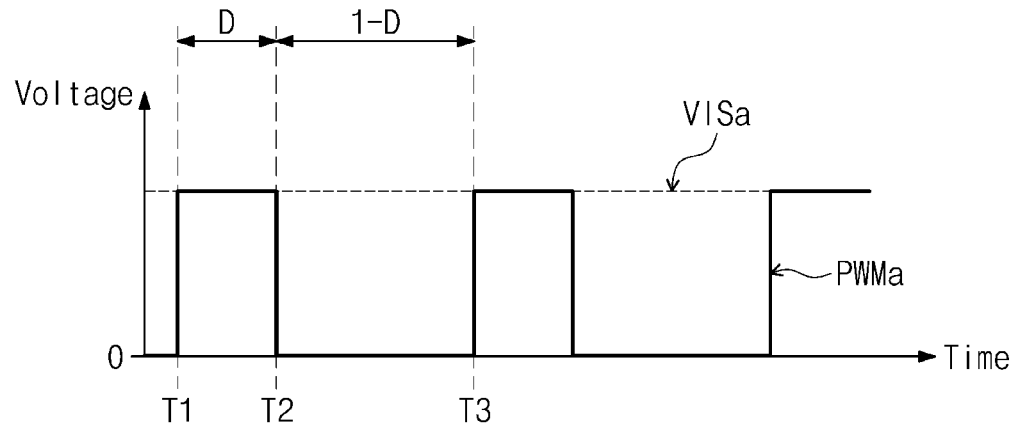
FIG. 16 illustrates a graph descriptive of an operation of a duty-based converter circuit of FIG. 13.
Figure 17:
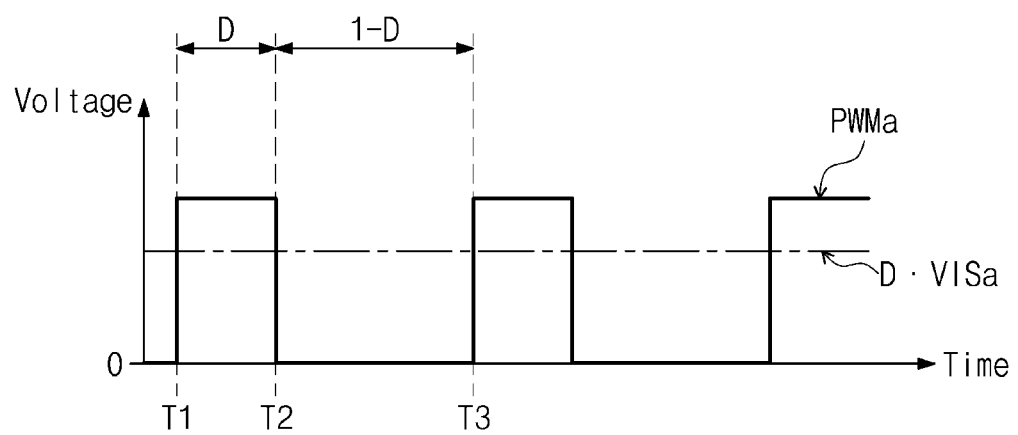
FIG. 17 illustrates a graph descriptive of an operation of a duty-based converter circuit of FIG. 13.

FIG. 14 illustrates a circuit diagram of a configuration of the duty-based converter circuit 2550 of FIG. 13. FIGS. 15 to 17 illustrate graphs descriptive of an operation of the duty-based converter circuit 2550 of FIG. 13. To facilitate better understanding, FIGS. 15 to 17 will be referenced together with FIG. 14.

The voltage buffer 2551 in FIG. 13 may include a voltage buffer 2551a such as shown in FIG. 14 for example. Referring to FIG. 14, the voltage buffer 2551a includes an operational amplifier A1, a transistor M1, and a resistor R11.

The operational amplifier A1 receives the voltage VIS through a non-inverting input terminal of the operational amplifier A1. The transistor M1 drives a voltage VISa of an inverting input terminal of the operational amplifier A1 from a driving voltage VDD, in response to an output of the operational amplifier A1. The resistor R11 stabilizes the voltage VISa of the inverting input terminal of the operational amplifier A1.

A level of the voltage VISa may be controlled to be substantially identical to the level of the voltage VIS, depending on an operation characteristic of the operational amplifier A1 and an operation of the transistor M1. Accordingly, the operational amplifier A1 may buffer the voltage VIS to provide the voltage VISa of a level corresponding to the level SM sampled from the voltage VLS.

The buffer 2553 in FIG. 13 may include a buffer 2553a such as shown in FIG. 14 for example. Referring to FIG. 14, the buffer 2553a includes inverters INV11 and INV12. The inverters INV11 and INV12 receive the control signal PWM and the voltage VISa. The inverters INV11 and INV12 may generate the intermediate signal PWMa based on the control signal PWM, by using the voltage VISa as an operation voltage. In particular, the inverter INV11 receives and inverts the control signal PMW, and provides the inverted control signal PWM to inverter INV12. Inverter INV12 in turn inverts the inverted control signal PWM to provide and output the intermediate signal PWMa.

Referring to FIG. 15, for example, a voltage level corresponding to logic high of the control signal PWM may be higher than the level of the voltage VISa. As the control signal PWM is transferred through the inverters INV11 and INV12, the intermediate signal PWMa of FIG. 16 is generated. In some cases, when the voltage level corresponding to logic high of the control signal PWM is lower than the level of the voltage VISa, the buffer 2553a may include a level shifter circuit, instead of the inverters INV11 and INV12, to shift the voltage level corresponding to logic high of the control signal PWM to the level of the voltage VISa.

Referring to FIG. 16, depending on an operation characteristic of the inverters INV11 and INV12, the intermediate signal PWMa may have a pulse width corresponding to a pulse width of the control signal PWM. In addition, the intermediate signal PWMa may have a pulse magnitude corresponding to the level of the voltage VISa (thus corresponding to the level of the voltage VIS).

The low-pass filter 2555 in FIG. 13 may include an RC filter 2555a such as shown in FIG. 14 for example. Returning to FIG. 14, the RC filter 2555a includes a resistor R12 and a capacitor C1. The RC filter 2555a outputs a voltage D·VISa by attenuating a high-frequency component of the intermediate signal PWMa through the resistor R12 and the capacitor C1.

Referring to FIG. 17, the pulse magnitude of the intermediate signal PWMa may correspond to the level of the voltage VISa, and the pulse width of the intermediate signal PWMa may correspond to the duration D. A level of the voltage D·VISa, which is generated as the intermediate signal PWMa passes through the low-pass filter 2555 (e.g., the RC filter 2555a), may correspond to an average level of the intermediate signal PWMa.

In other words, the level of the voltage D·VISa may be obtained as the duration D is applied to the level of the voltage VISa. For example, the level of the voltage D·VISa may be obtained by adjusting the sampled level SM of the voltage VIS by the ratio of the duration D to a sum of the duration D and the duration (1−D). As such, the level of the voltage D·VISa may be obtained from the sampled level SM of the voltage VIS by adjusting the sampled level SM of the voltage VIS. Meanwhile, the voltage VISa may be substantially identical to the voltage VIS, and thus the voltage D·VISa may be substantially identical to the voltage D·VIS.

FIG. 14 illustrates only one of possible example embodiments associated with the duty-based converter circuit 2550, and is not intended to limit the inventive concepts. The configuration of the duty-based converter circuit 2550 may be variously changed or modified to generate the voltage D·VIS based on the control signal PWM and the voltage VIS.

Figure 18:
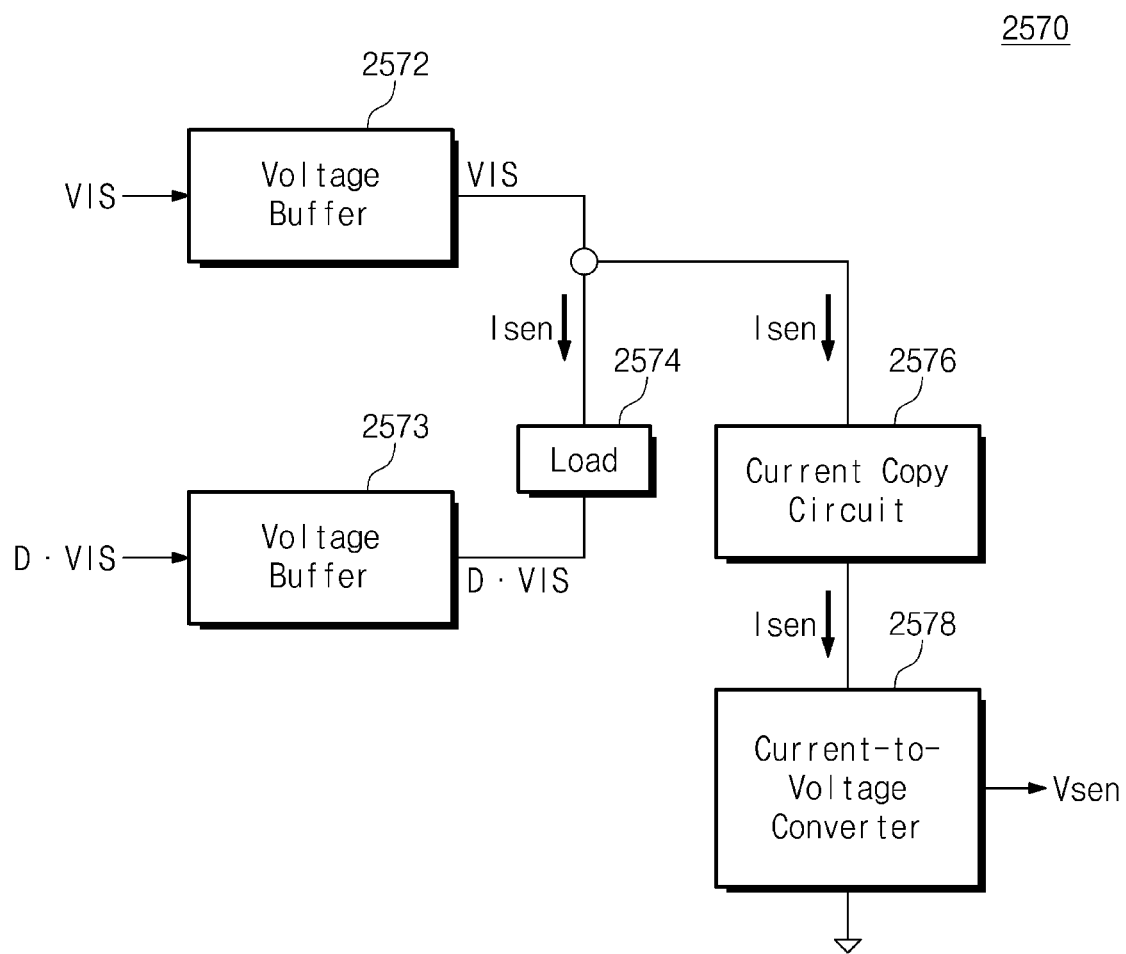
FIG. 18 illustrates a block diagram of a configuration of a subtractor circuit of FIG. 10.

FIG. 18 illustrates a block diagram of a configuration of the subtractor circuit 2570 of FIG. 10.

The subtractor circuit 2570 includes a voltage buffer 2572, a voltage buffer 2573, a load element 2574, a current copy circuit 2576, and a current-to-voltage converter 2578. However, the configuration of FIG. 18 is provided to facilitate better understanding, and is not intended to limit the inventive concepts. The configuration of the subtractor circuit 2570 may be variously changed or modified to perform operations to be described hereinafter.

The voltage buffer 2572 buffers the voltage VIS. The voltage buffer 2573 buffers the voltage VIS. As the buffered voltage VIS and the buffered voltage D·VIS are provided to both ends of the load element 2574, a current Isen may flow through the load element 2574 between the buffered voltage VIS and the buffered voltage D·VIS.

The current copy circuit 2576 copies the current Isen flowing through the load element 2574. Accordingly, a current Isen which flows along the current copy circuit 2576 is generated. The current-to-voltage converter 2578 converts the current Isen to the voltage Vsen. The voltage Vsen is output to have a level corresponding to an intensity of the current Isen.

Figure 19:
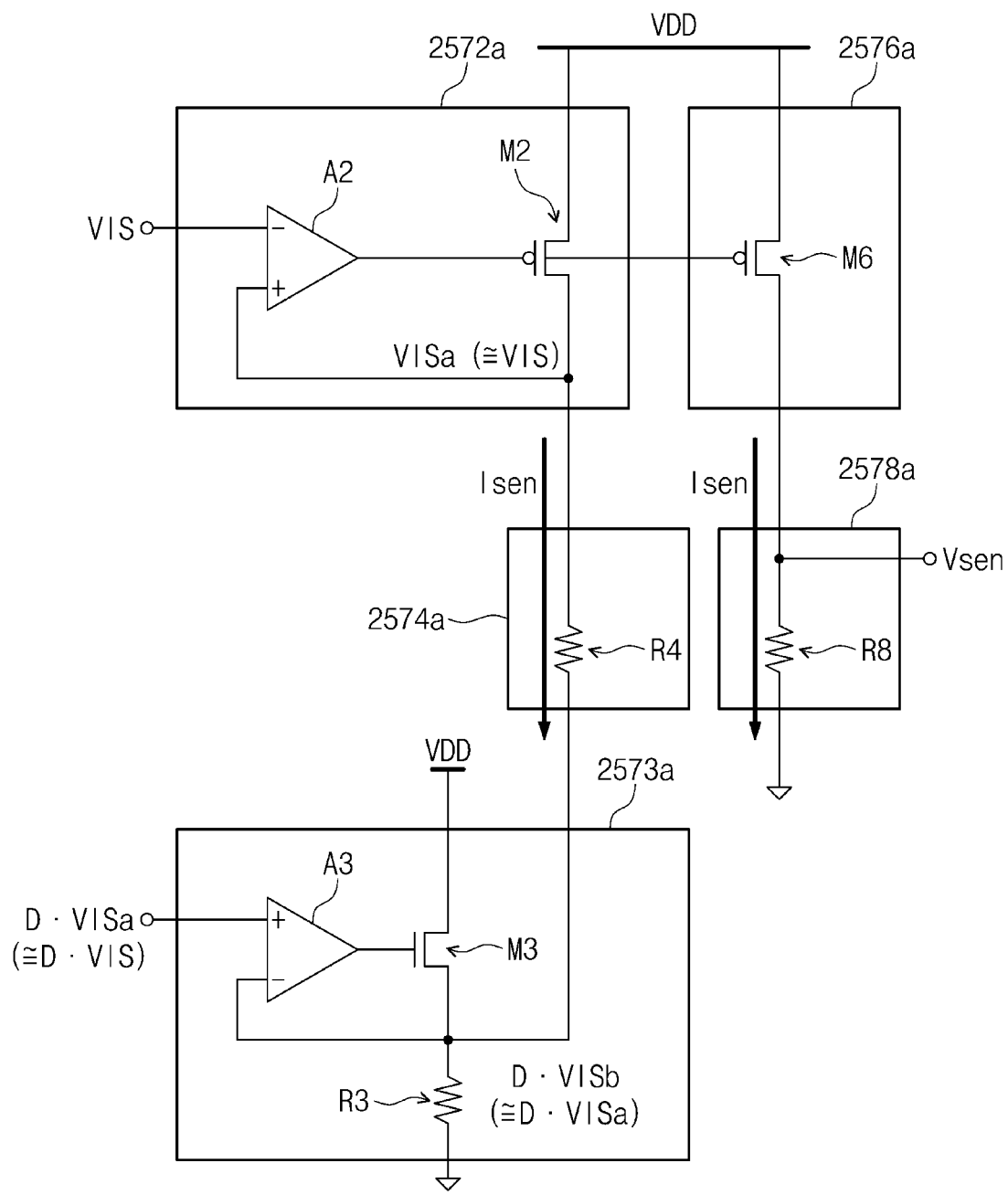
FIG. 19 illustrates a circuit diagram of a configuration of a subtractor circuit of FIG. 18.

FIG. 19 illustrates a circuit diagram of a configuration of the subtractor circuit 2570 of FIG. 18.

The voltage buffer 2572 in FIG. 18 may include a voltage buffer 2572a as shown in FIG. 19 for example. The voltage buffer 2572a includes an operational amplifier A2 and a transistor M2.

The operational amplifier A2 receives the voltage VIS through an inverting input terminal of the operational amplifier A2. The transistor M2 drives the voltage VISa of a non-inverting input terminal of the operational amplifier A2 from the driving voltage VDD, in response to an output of the operational amplifier A2.

A level of the voltage VISa may be controlled to be substantially identical to the level of the voltage VIS, depending on an operation characteristic of the operational amplifier A2 and an operation of the transistor M2. Accordingly, the operational amplifier A2 may buffer the voltage VIS to provide the voltage VISa of a level corresponding to the level SM sampled from the voltage VLS.

The voltage buffer 2573 in FIG. 18 may include a voltage buffer 2573a such as shown in FIG. 19 for example. The voltage buffer 2573a includes an operational amplifier A3, a transistor M3, and a resistor R3.

The operational amplifier A3 receives the voltage D·VIS through a non-inverting input terminal of the operational amplifier A3. In some example embodiments, the operational amplifier A3 may receive the voltage D·VISa from the RC filter 2555a. The transistor M3 drives a voltage D·VISb of an inverting input terminal of the operational amplifier A3 from the driving voltage VDD, in response to an output of the operational amplifier A3. The resistor R3 stabilizes the voltage D·VISb of the inverting input terminal of the operational amplifier A3.

A level of the voltage D·VISb may be controlled to be substantially identical to the level of the voltage D·VISa (thus to be substantially identical to the level of the voltage D·VIS), depending on an operation characteristic of the operational amplifier A3 and an operation of the transistor M3. Accordingly, the operational amplifier A3 may buffer the voltage D·VISa to provide the voltage D·VISb of a level corresponding to the level of the voltage D·VISa (thus corresponding to the level of the voltage D·VIS).

The load element 2574 in FIG. 18 may include a load element 2574a such as shown in FIG. 19 for example. The load element 2574a includes a resistive element R4. As the voltage VISa and the voltage D·VISb are provided to both ends of the resistive element R4, the current Isen may flow through the resistive element R4 between the voltage VISa and the voltage D·VISb.

The current copy circuit 2576 in FIG. 18 may include a current copy circuit 2576a such as shown in FIG. 19 for example. The current copy circuit 2576a includes a transistor M6.

The transistor M6 drives a current from the driving voltage VDD, in response to the output of the operational amplifier A2. The transistor M6 may be configured such that characteristics (e.g., a channel width, a gate structure, and/or the like) of the transistor M6 are identical to characteristics of the transistor M2. Due to the same condition, as the transistor M2 drives the current Isen in response to the output of the operational amplifier A2, the transistor M6 may also drive the current Isen in response to the output of the operational amplifier A2.

An intensity of the current Isen driven by the transistor M6 may be substantially identical to an intensity of the current Isen driven by the transistor M2. In other words, the current copy circuit 2576a may copy the current Isen flowing through the resistance element R4, and the copied current Isen may be output from the transistor M6.

The current-to-voltage converter 2578 in FIG. 18 may include a current-to-voltage converter 2578a such as shown in FIG. 19 for example. The current-to-voltage converter 2578a includes a resistive element R8.

The resistive element R8 is connected between the transistor M6 and the reference potential (e.g., ground voltage), and receives the current Isen from the transistor M6. The current Isen may flow through the resistive element R8 between the transistor M6 and the reference potential. In response to the current Isen flowing through the resistive element R8, the voltage Vsen may be output based on a voltage of a node between the resistive element R8 and the transistor M6. Accordingly, the current-to-voltage converter 2578a converts the current Isen to the voltage Vsen.

With regard to the resistive element R4, Equation 7 below may be satisfied.

$$Isen = \frac{VIS - D \cdot VIS}{R4} \quad \text{[Equation 7]}$$

With regard to the resistive element R8, Equation 8 below may be satisfied.

$$Vsen = Isen \cdot R8 = \frac{VIS - D \cdot VIS}{R4} \cdot R8 \quad \text{[Equation 8]}$$

In some example embodiments, the resistive elements R4 and R8 may be configured such that a resistance value of the resistive element R8 is identical to a resistance value of the resistive element R4. In such example embodiments, Equation 6 may be obtained from Equation 8.

As should be understood from Equation 6 and Equation 8, the voltage Vsen may be based on a difference between the level of the voltage VIS and the level of the voltage D·VIS. The subtractor circuit 2570 or 2570a may be understood as outputting the voltage Vsen based on the difference between the level of the voltage VIS and the level of the voltage D·VIS.

As described with reference to Equation 5 and Equation 6, the level of the voltage Vsen may indicate the information associated with the intensity of the load current Io. Accordingly, the level of the voltage Vsen may be used to estimate the intensity of the load current Io indirectly. Utilizing the estimated intensity of the load current Io will be described with reference to FIGS. 21 to 24.

In some example embodiments, when characteristics of elements (e.g., a capacitance value, a resistance value, a transistor size, and/or the like) are suitably selected, the level of the voltage Vsen may be scaled such that a ratio of the level of the voltage Vsen to the intensity of the load current Io is 1:1. In such example embodiments, a value of the level of the voltage Vsen may be used directly as a value of the intensity of the load current Io without additional processing, and thus convenience of operations which are based on the estimated intensity may be improved.

Figure 20:
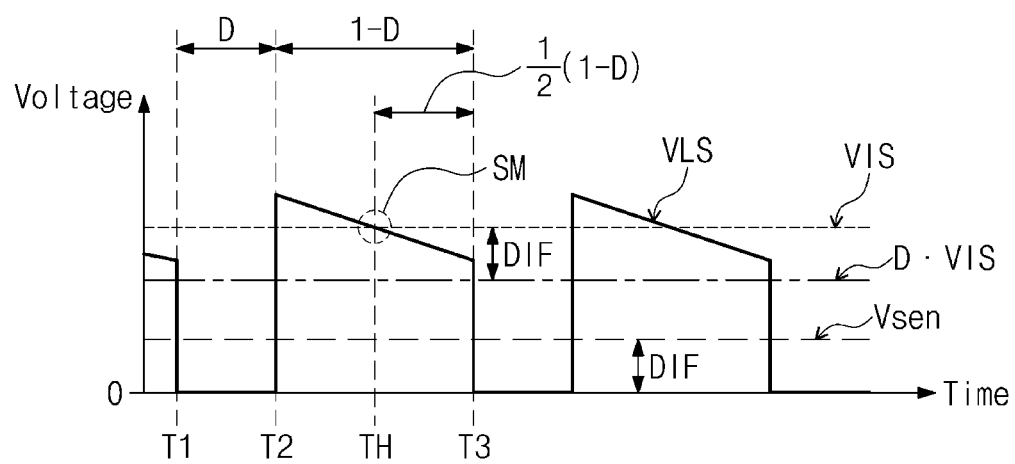
FIG. 20 illustrates a graph descriptive of an operation of a subtractor circuit of FIG. 18.

FIG. 20 illustrates a graph descriptive of an operation of the subtractor circuit 2570 of FIG. 18.

As the voltage VLS is sampled at the reference time point (e.g. the time point TH), the level SM of the voltage VIS may be sampled corresponding to the average level of the voltage VLS. In addition, the voltage D·VIS may be obtained by adjusting the level of the voltage VIS based on the duration D.

The voltage Vsen is based on a difference DIF between the voltage VIS and the voltage D·VIS. For example, in an example embodiment in which the resistance values of the resistive elements R4 and R8 are identical, the level of the voltage Vsen may correspond to the difference DIF.

As described above, the voltage VIS and the control signal PWM may be used to generate the voltage Vsen. The voltage VIS may be based on the voltage VLS, and a waveform of the control signal PWM may depend on the duration D. Accordingly, the level of the voltage Vsen may change based on the level of the voltage VLS in the time interval where the switch element MN is disconnected and the switch element MP is connected. In addition, the level of the voltage Vsen may change based on the duration D (or depending on the duty ratio of the duration D and the duration (1−D)).

Figure 21:
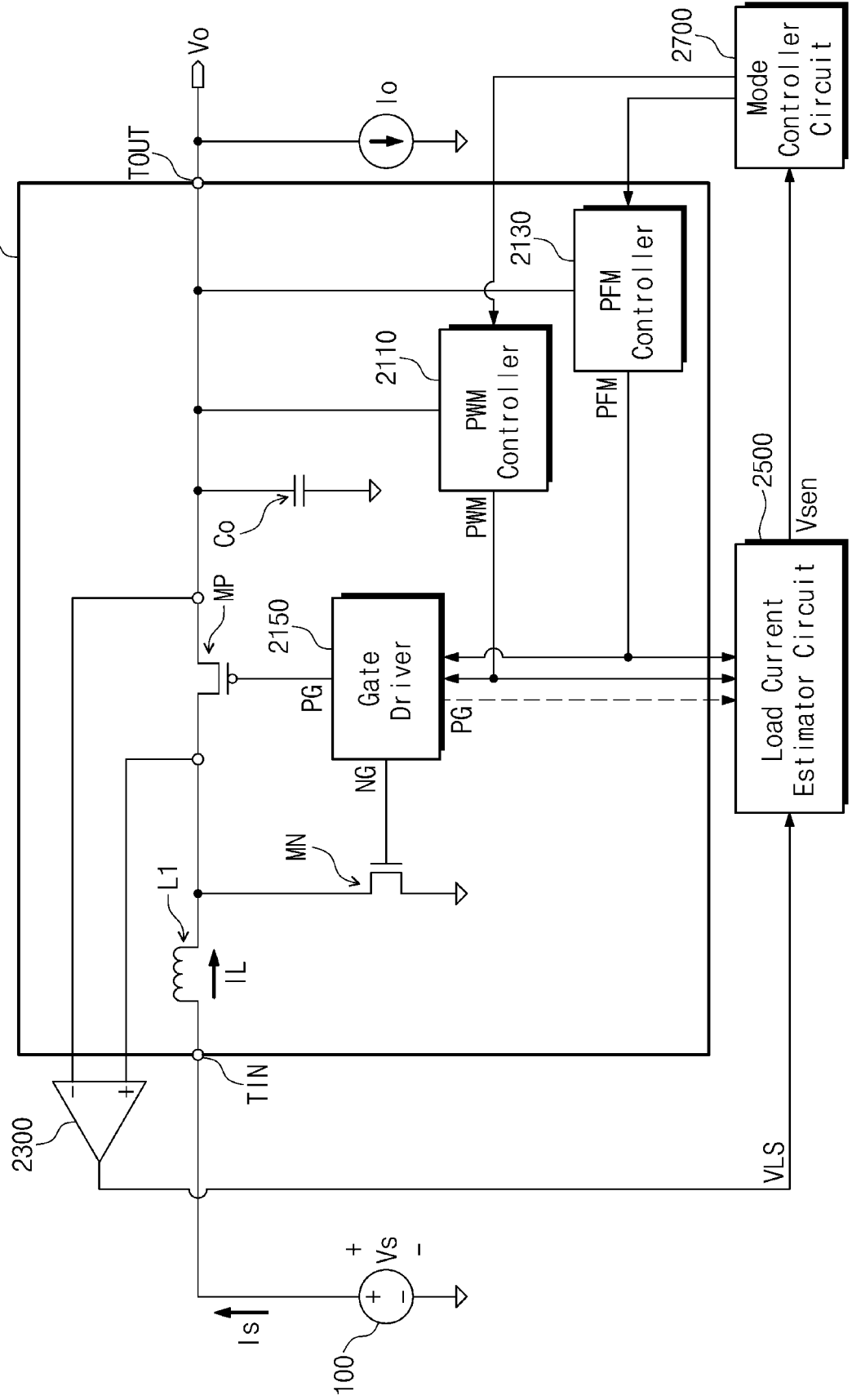
FIG. 21 illustrates a block diagram of a configuration of an electronic circuit included in a DC-DC converter circuit of FIG. 2.

FIG. 21 illustrates a block diagram of a configuration of an electronic circuit 2000a included in the DC-DC converter circuit 1905 or 1915 of FIG. 2. In some example embodiments, the electronic circuit 2000 of FIG. 3 may include the electronic circuit 2000a of FIG. 21.

The electronic circuit 2000a includes a boost converter 2100a, the voltage sensor 2300, the load current estimator circuit 2500, and a mode controller circuit 2700. The boost converter 2100a includes the inductive element L1, the switch elements MN and MP, the capacitive element Co, the PWM controller 2110, a pulse frequency modulation (PFM) controller 2130, and the gate driver 2150. The inductive element L1, the switch elements MN and MP, the capacitive element Co, the PWM controller 2110, the gate driver 2150, the voltage sensor 2300, and the load current estimator circuit 2500 have been described with reference to FIGS. 3 to 20. Accordingly, repetitive description of the structure and functionality of the circuit elements as shown in FIG. 21 may be omitted.

As previously described, the PWM controller 2110 generates the control signal PWM based on the output voltage Vo to control the switch elements MN and MP. Likewise, the PFM controller 2130 is connected to the output terminal TOUT, and generates a control signal PFM based on the output voltage Vo to control the switch elements MN and MP.

The PWM controller 2110 generates the control signal PWM to control the switch elements MN and MP in a first manner when the voltage Vsen satisfies a first condition. Herein, the first manner may include a PWM manner, or in other words corresponds to control by pulse width modulation. For example, the first condition may be satisfied when the level of the voltage Vsen is higher than a threshold value.

The PFM controller 2130 generates the control signal PFM to control the switch elements MN and MP in a second manner when the voltage Vsen satisfies a second condition. Herein, the second manner may include a PFM manner, or in other words corresponds to control by pulse frequency modulation. The second condition may be different from the first condition. For example, the second condition may be satisfied when the level of the voltage Vsen is lower than the threshold value.

The mode controller circuit 2700 selects a control mode of the boost converter 2100a based on the voltage Vsen. For example, the mode controller circuit 2700 controls the PWM controller 2110 and the PFM controller 2130 based on the level of the voltage Vsen such that the first manner of the PWM controller 2110 or the second manner of the PFM controller 2130 is selectively provided. As such, the voltage Vsen may be referenced to select the control mode of the boost converter 2100a.

Figure 22:
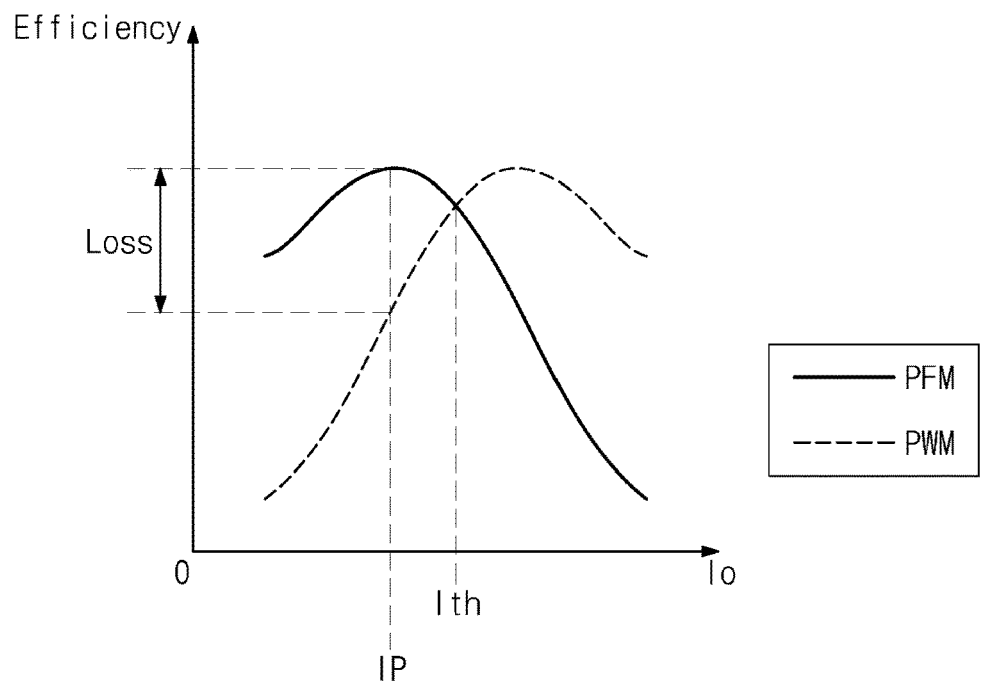
FIG. 22 illustrates a graph descriptive of an operation of a mode controller circuit of FIG. 21.
Figure 23:
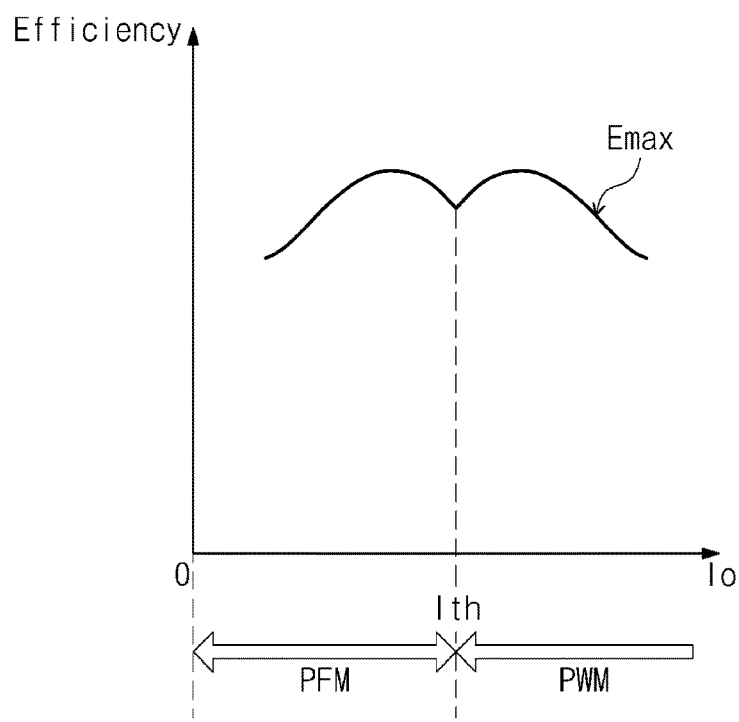
FIG. 23 illustrates a graph descriptive of an operation of a mode controller circuit of FIG. 21.

FIGS. 22 and 23 illustrate graphs descriptive of an operation of the mode controller circuit 2700 of FIG. 21.

FIG. 22 illustrates voltage conversion efficiency of the boost converter 2100a when operating depending on the PWM manner (refer to a dotted line) and voltage conversion efficiency of the boost converter 2100a when operating depending on the PFM manner (refer to a solid line). It is known that the PWM manner can provide higher efficiency when the intensity of the load current Io is relatively high, and the PFM manner can provide higher efficiency when the intensity of the load current Io is relatively low.

For example, when the intensity of the load current Io is a threshold intensity Ith, the efficiency provided by the PWM manner is identical to the efficiency provided by the PFM manner. When the intensity of the load current Io is higher than the threshold intensity Ith, the PWM manner provides higher efficiency. On the other hand, when the intensity of the load current Io is lower than the threshold intensity Ith, the PFM manner provides higher efficiency.

For example, when the boost converter 2100a operates in the PWM manner when the intensity of the load current Io is an intensity IP, loss of voltage conversion may occur in comparison to an operation of the PFM manner. When the intensity of the load current Io is the intensity IP lower than the threshold intensity Ith, an operation of the PFM manner may be more advantageous. Similar discussions may be applied for a case where the intensity of the load current Io is higher than the threshold intensity Ith.

Referring to FIG. 23, if a control of the PFM manner is provided when the intensity of the load current Io is lower than the threshold intensity Ith, and a control of the PWM manner is provided when the intensity of the load current Io is higher than the threshold intensity Ith, maximum efficiency E max may be obtained. Accordingly, the accurate estimation or measurement of the intensity of the load current Io may be advantageous to reduce power loss and to operate the boost converter 2100a efficiently.

In example embodiments, the load current estimator circuit 2500 may output the voltage Vsen associated with the intensity of the load current Io. The mode controller circuit 2700 may obtain accurate information associated with the intensity of the load current Io based on the level of the voltage Vsen. The mode controller circuit 2700 may control the PWM controller 2110 and the PFM controller 2130 based on the obtained information (e.g., based on whether the level of the voltage Vsen is higher or lower than a threshold value).

Figure 24:
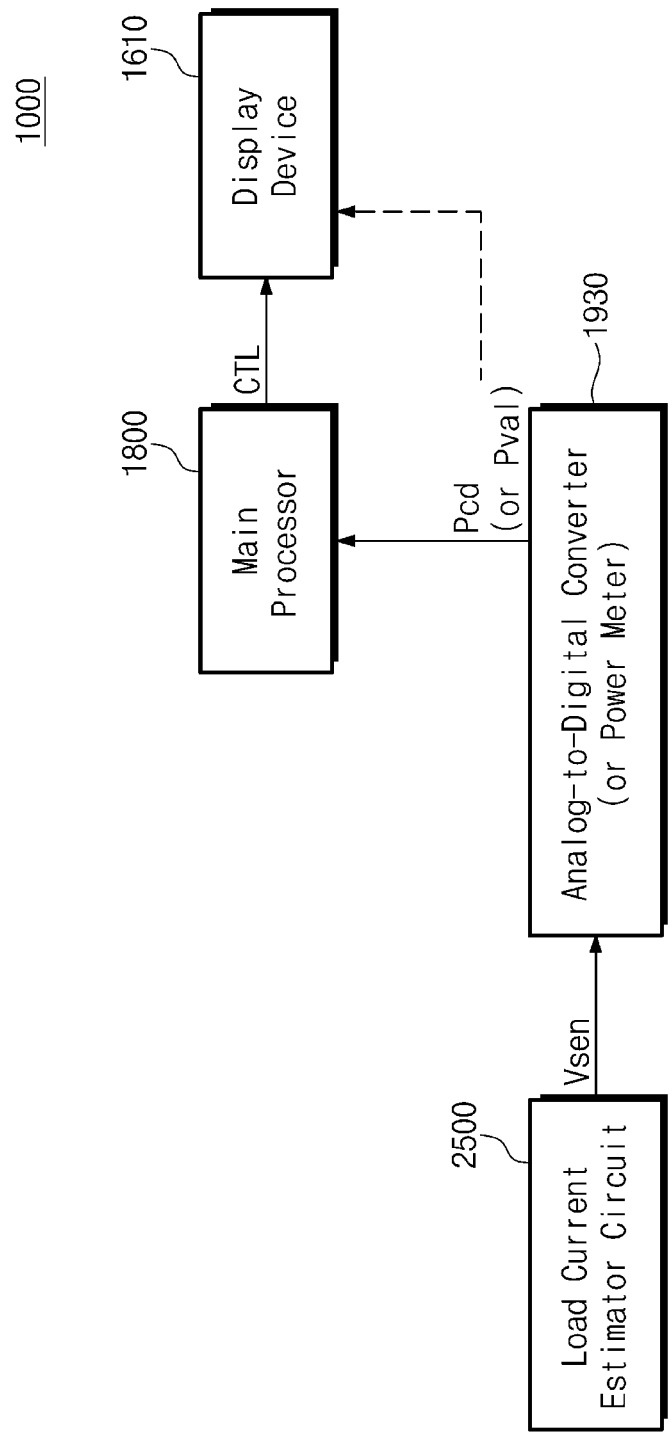
FIG. 24 illustrates a block diagram of a configuration which may be included in an electronic device of FIG. 1.

FIG. 24 illustrates a block diagram of a configuration which may be included in the electronic device 1000 of FIG. 1.

In some example embodiments, the electronic device 1000 may include an analog-to-digital converter (or power meter) 1930. The analog-to-digital converter (or power meter) 1930 receives the voltage Vsen from the load current estimator circuit 2500. The analog-to-digital converter 1930 converts a level of the voltage Vsen to a code value Pcd (or the power meter may measure the level of the voltage Vsen to output a measurement value Pval). The level of the voltage Vsen may indicate the intensity of the load current Io, and thus the code value Pcd or the measurement value Pval may indicate the intensity of the load current Io.

The main processor 1800 calculates or estimates an amount of power (e.g., the load current Io) consumed by the electronic device 1000 and/or the main processor 1800, based on the code value Pcd or the measurement value Pval. The main processor 1800 adjusts an operation status (e.g., an operation voltage, an operation frequency, and/or the like) of the main processor 1800 based on the calculated or estimated amount.

The main processor 1800 generates a control signal CTL based on the code value Pcd or the measurement value Pval. The control signal CTL is output to control an operation status of a component of the electronic device 1000. For example, an operation status of the display device 1610

(and/or other components) may be controlled based on the control signal CTL. For example, when an amount of power (e.g., the load current Io) consumed by the display device 1610 is excessive, the display device 1610 may switch a power mode or may change an operation frequency in response to the control signal CTL.

In some cases, the operation status of the display device 1610 (and/or other components) may be controlled directly based on the code value Pcd or the measurement value Pval, instead of the control signal CTL.

The above descriptions are intended to provide example configurations and operations for implementing the inventive concepts. The inventive concepts may include implementations which may be obtained by simply changing or modifying the above example embodiments, in addition to the above-described example embodiments. Also, the inventive concepts may include implementations which may be accomplished by easily changing or modifying the above-described example embodiments in the future.

What is claimed is:

1. An electronic circuit comprising:
    an inductive element having a first end and a second end, the first end connected to an input terminal receiving an input current, the inductive element outputting an inductor current at the second end based on the input current;
    a first transistor connected to the second end of the inductive element and a reference terminal at which a reference voltage is applied;
    a second transistor having first and second ends, the first end of the second transistor connected to the second end of the inductive element and the second end of the second transistor connected to an output terminal of the electronic circuit, the second transistor configured to output a load current to the output terminal responsive to the inductor current; and
    a load current estimator circuit configured to
    receive a first voltage sensed between the first and second ends of the second transistor in response to the inductor current when the first transistor is turned off and the second transistor is turned on, and
    output a second voltage based on a level of the first voltage at a reference time point within a first time interval when the second transistor is turned on,
    wherein the second voltage is associated with an intensity of the load current,
    wherein the electronic circuit further comprising a controller configured to generate a control signal for controlling turn-on and turn-off of the first transistor and the second transistor,
    wherein the load current estimator circuit comprises
    a first operational amplifier configured to buffer a third voltage to provide a fourth voltage having a level corresponding to a sampled level,
    inverters configured to generate and output an intermediate signal having a pulse width corresponding to a pulse width of the control signal, and a pulse magnitude corresponding to the level of the fourth voltage, and
    an RC filter configured to output a fifth voltage having a level corresponding to an average level of the intermediate signal,
    wherein the third voltage is a sampled level of the first voltage.

2. The electronic circuit of claim 1, further comprising a controller configured to generate a control signal for controlling the first transistor and the second transistor based on an output voltage at the output terminal, to turn off the second transistor when the first transistor is turned on, and to turn on the second transistor when the first transistor is turned off.

3. The electronic circuit of claim 2, wherein turning on and turning off of the first transistor and the second transistor are repeated, an increase and a decrease in an intensity of the inductor current are repeated, and
    wherein when the intensity of the inductor current decreases, the level of the first voltage decreases, and
    when the intensity of the inductor current increases, the level of the first voltage corresponds to a level of the reference voltage.

4. The electronic circuit of claim 2, wherein when the first transistor is turned off and the second transistor is turned on, the level of the first voltage decreases, and
    when the first transistor is turned on and the second transistor is turned off, the level of the first voltage corresponds to a level of the reference voltage.

5. The electronic circuit of claim 2, wherein when a level of the output voltage becomes lower than a reference level, a first duration of the first time interval when the second transistor is turned on decreases,
    when the level of the output voltage becomes higher than the reference level, a second duration of a second time interval when the first transistor is turned on decreases, and
    the level of the first voltage and a level of the second voltage change depending on a duty ratio of the first duration and the second duration.

6. The electronic circuit of claim 1, wherein the load current estimator circuit comprises a sample and hold circuit, the sample and hold circuit configured to sample the level of the first voltage at the reference time point to output the third voltage of the sampled level of the first voltage.

7. The electronic circuit of claim 1, wherein the load current estimator circuit further comprises:
    a second operational amplifier configured to buffer the third voltage to provide a sixth voltage having the level corresponding to the sampled level;
    a third transistor configured to drive the sixth voltage from a driving voltage in response to an output of the second operational amplifier;
    a third operational amplifier configured to buffer the fifth voltage to provide a seventh voltage having a level corresponding to the level of the fifth voltage;
    a first resistive element having a first end connected to the sixth voltage and a second end connected to the seventh voltage, the first current flowing through the first resistive element;
    a fourth transistor having a characteristic identical to a characteristic of the third transistor, the fourth transistor configured to drive a second current from the driving voltage in response to the output of the second operational amplifier, an intensity of the second current being identical to an intensity of the first current; and
    a second resistive element having a first end connected to the fourth transistor and a second end connected to the reference terminal, the second current flowing through the second resistive element.

8. The electronic circuit of claim 7, wherein the second voltage is output based on a voltage of a node between the second resistive element and the fourth transistor.

9. The electronic circuit of claim 1, wherein the load current estimator circuit is configured to output the second voltage based on the level of the first voltage without directly sensing the load current.

10. An electronic circuit comprising:
a boost converter configured to output an output voltage at an output terminal, the output voltage having a level boosted to be higher than a level of an input voltage at an input terminal; and
a load current estimator circuit configured to
receive a first voltage sensed at the boost converter without sensing an input current input to the input terminal and without sensing a load current output from the output terminal, and
output a second voltage associated with an intensity of the load current, based on the first voltage,
wherein the level of the output voltage changes with a first pattern in a first time interval, and changes with a second pattern in a second time interval which does not overlap the first time interval, and
a level of the second voltage changes based on a level of the first voltage in the first time interval and a duration of the first time interval,
wherein the boost converter is configured to control a change in the level of the output voltage based on a control signal, and
the load current estimator circuit is further configured to
generate a third voltage by sampling the level of the first voltage at a reference time point corresponding to a half of the duration of the first time interval,
generate a fourth voltage having a level corresponding to an average level of an intermediate signal which has a pulse width corresponding to a pulse width of the control signal and a pulse magnitude corresponding to a level of the third voltage, and
output the second voltage based on a difference between the level of the third voltage and the level of the fourth voltage.

11. The electronic circuit of claim 10, wherein the boost converter comprises an inductive element and a switch element between the input terminal and the output terminal, and
the first voltage is sensed from between first and second ends of the switch element when the switch element transfers to the output terminal an inductor current output from the inductive element based on the input current.

12. The electronic circuit of claim 10, wherein the load current estimator circuit comprises:
a voltage buffer configured to buffer the third voltage;
a buffer configured to generate the intermediate signal from the control signal by using the buffered third voltage; and
a low-pass filter configured to generate the fourth voltage by attenuating a high-frequency component of the intermediate signal.

13. The electronic circuit of claim 10, wherein the load current estimator circuit comprises:
a first voltage buffer configured to buffer the third voltage to provide a buffered third voltage;
a second voltage buffer configured to buffer the fourth voltage to provide a fourth buffered voltage;
a load element having a first end connected to the buffered third voltage and a second end connected to the buffered fourth voltage, a first current flowing through the load element;
a current copy circuit configured to generate a second current copied from the first current; and
a current-to-voltage converter configured to convert the second current to the second voltage.

14. An electronic circuit comprising:
a boost converter configured to output an output voltage having a level boosted to be higher than a level of an input voltage; and
a load current estimator circuit configured to receive a first voltage sensed at the boost converter,
wherein a level of the first voltage changes in a first time interval during which the level of the output voltage changes with a first pattern,
the level of the first voltage corresponds to a level of a reference voltage in a second time interval during which the level of the output voltage changes with a second pattern, and
the load current estimator circuit is further configured to
output a second voltage based on the level of the first voltage which is sampled at a reference time point within the first time interval to provide a sampled level of the first voltage, irrespective of the level of the first voltage in the second time interval,
wherein the boost converter is configured to control a change in the level of the output voltage based on a control signal, and
the load current estimator circuit is further configured to
generate a third voltage by sampling the level of the first voltage at a reference time point corresponding to a half of the duration of the first time interval,
generate a fourth voltage having a level corresponding to an average level of an intermediate signal which has a pulse width corresponding to a pulse width of the control signal and a pulse magnitude corresponding to a level of the third voltage, and
output the second voltage further based on a difference between the level of the third voltage and the level of the fourth voltage.

15. The electronic circuit of claim 14, wherein a level of the second voltage is based on a difference between the sampled level of the first voltage and an adjusted level based on the sampled level.

16. The electronic circuit of claim 15, wherein the adjusted level is obtained by adjusting the sampled level by a ratio of a second duration of the second time interval, to a sum of a first duration of the first time interval and the second duration.

17. The electronic circuit of claim 14, wherein the second voltage is associated with an intensity of a load current which is output from an output terminal of the electronic circuit at which the output voltage is output.

* * * * *